(12) United States Patent
Chen et al.

(10) Patent No.: US 11,620,403 B2
(45) Date of Patent: Apr. 4, 2023

(54) SYSTEMS AND METHODS FOR SECURE DATA AGGREGATION AND COMPUTATION

(71) Applicant: Experian Information Solutions, Inc., Costa Mesa, CA (US)

(72) Inventors: Kevin Chen, San Diego, CA (US); Hua Li, San Diego, CA (US); Juncheng Liu, San Diego, CA (US); Zhixuan Wang, San Diego, CA (US); Shumin Guo, Irvine, CA (US); Eric Haller, Encinitas, CA (US); Steve Yin, Del Mar, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 511 days.

(21) Appl. No.: 16/738,942

(22) Filed: Jan. 9, 2020

(65) Prior Publication Data

US 2020/0226284 A1    Jul. 16, 2020

Related U.S. Application Data

(60) Provisional application No. 62/791,554, filed on Jan. 11, 2019.

(51) Int. Cl.
    *G06F 21/62*    (2013.01)
    *G06Q 50/26*    (2012.01)
    (Continued)

(52) U.S. Cl.
    CPC ...... *G06F 21/6245* (2013.01); *G06F 16/9535* (2019.01); *G06F 21/602* (2013.01); *G06Q 40/025* (2013.01); *G06Q 50/265* (2013.01)

(58) Field of Classification Search
    CPC combination set(s) only.
    See application file for complete search history.

(56) References Cited

U.S. PATENT DOCUMENTS

| | | |
|---|---|---|
| 3,316,395 A | 4/1967 | Lavin et al. |
| 4,346,442 A | 8/1982 | Musmanno |

(Continued)

FOREIGN PATENT DOCUMENTS

| | | |
|---|---|---|
| CN | 101452555 | 6/2009 |
| CN | 102096886 | 6/2011 |

(Continued)

OTHER PUBLICATIONS

NPL Search Terms (Year: 2022).*

(Continued)

*Primary Examiner* — Syed A Zaidi
(74) *Attorney, Agent, or Firm* — Knobbe, Martens, Olson & Bear LLP

(57) ABSTRACT

Systems and methods for data aggregation and processing are provided in manner that is decentralized and preserves privacy. A data aggregation and computation system may include an interface, a controller, and one or more clusters of computation nodes. The interface may receive an inquiry from a requesting entity for computing information regarding an individual based on pieces of information held by a plurality of entities. The controller may communicate an identifier for the individual to a processor system associated with each of the entities based on the inquiry. The clusters of computation nodes may each receive encrypted data fragments from each of the processor systems, the data fragments comprising unrecognizable fragments that no individual processor system can re-assemble to recover the information, perform secure, multi-party computations based on the data fragments, and generate a result based on the secure, multi-party computations for the individual.

20 Claims, 7 Drawing Sheets

(51) Int. Cl.
  *G06F 16/9535*  (2019.01)
  *G06F 21/60*  (2013.01)
  *G06Q 40/02*  (2023.01)

(56) References Cited

U.S. PATENT DOCUMENTS

| | | | |
|---|---|---|---|
| 4,491,725 A | 1/1985 | Pritchard |
| 4,774,664 A | 9/1988 | Campbell et al. |
| 4,812,628 A | 3/1989 | Boston et al. |
| 4,872,113 A | 10/1989 | Dinerstein |
| 4,891,503 A | 1/1990 | Jewell |
| 4,947,028 A | 8/1990 | Gorog |
| 5,239,462 A | 8/1993 | Jones et al. |
| 5,274,547 A | 12/1993 | Zoffel et al. |
| 5,301,105 A | 4/1994 | Cummings, Jr. |
| 5,500,513 A | 3/1996 | Langhans et al. |
| 5,557,514 A | 9/1996 | Seare et al. |
| 5,583,760 A | 12/1996 | Klesse |
| 5,590,038 A | 12/1996 | Pitroda |
| 5,611,052 A | 3/1997 | Dykstra et al. |
| 5,640,577 A | 6/1997 | Scharmer |
| 5,644,778 A | 7/1997 | Burks et al. |
| 5,649,114 A | 7/1997 | Deaton et al. |
| 5,659,725 A | 8/1997 | Levy et al. |
| 5,696,907 A | 12/1997 | Tom |
| 5,699,527 A | 12/1997 | Davidson |
| 5,704,044 A | 12/1997 | Tarter et al. |
| 5,739,512 A | 4/1998 | Tognazzini |
| 5,754,632 A | 5/1998 | Smith |
| 5,754,939 A | 5/1998 | Herz et al. |
| 5,764,923 A | 6/1998 | Tallman et al. |
| 5,774,883 A | 6/1998 | Andersen |
| 5,819,291 A | 10/1998 | Haimowitz et al. |
| 5,822,410 A | 10/1998 | McCausland et al. |
| 5,828,837 A | 10/1998 | Eikland |
| 5,832,068 A | 11/1998 | Smith |
| 5,832,447 A | 11/1998 | Rieker et al. |
| 5,842,211 A | 11/1998 | Horadan et al. |
| 5,844,218 A | 12/1998 | Kawan et al. |
| 5,870,721 A | 2/1999 | Norris |
| 5,878,403 A | 3/1999 | DeFrancesco |
| 5,884,287 A | 3/1999 | Edesess |
| 5,903,830 A | 5/1999 | Joao et al. |
| 5,903,881 A | 5/1999 | Schrader et al. |
| 5,907,828 A | 5/1999 | Meyer et al. |
| 5,924,082 A | 7/1999 | Silverman et al. |
| 5,926,800 A | 7/1999 | Baronowski et al. |
| 5,930,759 A | 7/1999 | Moore et al. |
| 5,930,776 A | 7/1999 | Dykstra et al. |
| 5,933,809 A | 8/1999 | Hunt et al. |
| 5,940,812 A | 8/1999 | Tengel et al. |
| 5,950,179 A | 9/1999 | Buchanan et al. |
| 5,956,693 A | 9/1999 | Geerlings |
| 5,960,430 A | 9/1999 | Haimowitz et al. |
| 5,961,593 A | 10/1999 | Gabber et al. |
| 5,966,699 A | 10/1999 | Zandi |
| 5,970,478 A | 10/1999 | Walker et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,014,632 A | 1/2000 | Gamble et al. |
| 6,018,723 A | 1/2000 | Siegel et al. |
| 6,021,397 A | 2/2000 | Jones et al. |
| 6,029,149 A | 2/2000 | Dykstra et al. |
| 6,038,551 A | 3/2000 | Barlow et al. |
| 6,044,351 A | 3/2000 | Jones |
| 6,044,352 A | 3/2000 | Deavers |
| 6,067,522 A | 5/2000 | Warady et al. |
| 6,070,241 A | 5/2000 | Edwards et al. |
| 6,073,104 A | 6/2000 | Field |
| 6,073,106 A | 6/2000 | Rozen et al. |
| 6,088,686 A | 7/2000 | Walker et al. |
| 6,098,052 A | 8/2000 | Kosiba et al. |
| 6,108,641 A | 8/2000 | Kenna et al. |
| 6,119,103 A | 9/2000 | Basch et al. |
| 6,128,602 A | 10/2000 | Northington et al. |
| 6,129,273 A | 10/2000 | Shah |
| 6,144,948 A | 11/2000 | Walker et al. |
| 6,154,729 A | 11/2000 | Cannon et al. |
| 6,157,707 A | 12/2000 | Baulier et al. |
| 6,163,770 A | 12/2000 | Gamble et al. |
| 6,171,112 B1 | 1/2001 | Clark et al. |
| 6,182,229 B1 | 1/2001 | Nielsen |
| 6,185,543 B1 | 2/2001 | Galperin et al. |
| 6,208,973 B1 | 3/2001 | Boyer et al. |
| 6,233,566 B1 | 5/2001 | Levine et al. |
| 6,253,202 B1 | 6/2001 | Gilmour |
| 6,253,203 B1 | 6/2001 | O'Flaherty et al. |
| 6,263,447 B1 | 7/2001 | French et al. |
| 6,269,369 B1 | 7/2001 | Robertson |
| 6,275,824 B1 | 8/2001 | O'Flaherty et al. |
| 6,282,658 B2 | 8/2001 | French et al. |
| 6,298,348 B1 | 10/2001 | Eldering |
| 6,304,860 B1 | 10/2001 | Martin et al. |
| 6,311,169 B2 | 10/2001 | Duhon |
| 6,321,205 B1 | 11/2001 | Eder |
| 6,321,339 B1 | 11/2001 | French et al. |
| 6,343,279 B1 | 1/2002 | Bissonette et al. |
| 6,374,229 B1 | 4/2002 | Lowrey et al. |
| 6,374,230 B1 | 4/2002 | Walker et al. |
| 6,384,844 B1 | 5/2002 | Stewart et al. |
| 6,385,594 B1 | 5/2002 | Lebda et al. |
| 6,393,406 B1 | 5/2002 | Eder |
| 6,397,197 B1 | 5/2002 | Gindlesperger |
| 6,397,224 B1 | 5/2002 | Zubeldia et al. |
| 6,405,181 B2 | 6/2002 | Lent et al. |
| 6,424,878 B1 | 7/2002 | Barker et al. |
| 6,453,297 B1 | 9/2002 | Burks et al. |
| 6,456,983 B1 | 9/2002 | Keyes et al. |
| 6,463,533 B1 | 10/2002 | Calamera et al. |
| 6,496,827 B2 | 12/2002 | Kozam et al. |
| 6,496,936 B1 | 12/2002 | French et al. |
| 6,513,018 B1 | 1/2003 | Culhane |
| 6,523,021 B1 | 2/2003 | Monberg et al. |
| 6,532,450 B1 | 3/2003 | Brown et al. |
| 6,543,683 B2 | 4/2003 | Hoffman |
| 6,564,210 B1 | 5/2003 | Korda et al. |
| 6,581,059 B1 | 6/2003 | Barrett et al. |
| 6,587,841 B1 | 7/2003 | DeFrancesco |
| 6,598,030 B1 | 7/2003 | Siegel et al. |
| 6,601,173 B1 | 7/2003 | Mohler |
| 6,611,816 B2 | 8/2003 | Lebda et al. |
| 6,622,131 B1 | 9/2003 | Brown et al. |
| 6,629,245 B1 | 9/2003 | Stone et al. |
| 6,647,383 B1 | 11/2003 | August et al. |
| 6,658,393 B1 | 12/2003 | Basch et al. |
| 6,684,093 B2 | 1/2004 | Kuth |
| 6,714,944 B1 | 3/2004 | Shapiro et al. |
| 6,734,886 B1 | 5/2004 | Hagan et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,795,812 B1 | 9/2004 | Lent et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,823,319 B1 | 11/2004 | Lynch et al. |
| 6,826,535 B2 | 11/2004 | Wood et al. |
| 6,845,448 B1 | 1/2005 | Chaganti et al. |
| 6,847,942 B1 | 1/2005 | Land et al. |
| 6,857,073 B2 | 2/2005 | French et al. |
| 6,873,972 B1 | 3/2005 | Marcial et al. |
| 6,901,406 B2 | 5/2005 | Nabe et al. |
| 6,910,624 B1 | 6/2005 | Natsuno |
| 6,934,714 B2 | 8/2005 | Meinig |
| 6,950,807 B2 | 9/2005 | Brock |
| 6,950,858 B2 | 9/2005 | Ogami |
| 6,954,757 B2 | 10/2005 | Zargham et al. |
| 6,968,319 B1 | 11/2005 | Remington et al. |
| 6,983,379 B1 | 1/2006 | Spalink et al. |
| 6,985,887 B1 | 1/2006 | Sunstein et al. |
| 6,988,085 B2 | 1/2006 | Hedy |

(56) References Cited

U.S. PATENT DOCUMENTS

| | | |
|---|---|---|
| 6,999,941 B1 | 2/2006 | Agarwal |
| 7,003,491 B2 | 2/2006 | Starkman |
| 7,028,052 B2 | 4/2006 | Chapman et al. |
| 7,039,607 B2 | 5/2006 | Watarai et al. |
| 7,058,817 B1 | 6/2006 | Ellmore |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,842 B2 | 7/2006 | Provost et al. |
| 7,076,462 B1 | 7/2006 | Nelson et al. |
| 7,107,241 B1 | 9/2006 | Pinto |
| 7,117,172 B1 | 10/2006 | Black |
| 7,124,144 B2 | 10/2006 | Christianson et al. |
| 7,133,840 B1 | 11/2006 | Kenna et al. |
| 7,133,935 B2 | 11/2006 | Hedy |
| 7,171,371 B2 | 1/2007 | Goldstein |
| 7,174,302 B2 | 2/2007 | Patricelli et al. |
| 7,181,427 B1 | 2/2007 | DeFrancesco |
| 7,188,169 B2 | 3/2007 | Buus et al. |
| 7,191,150 B1 | 3/2007 | Shao et al. |
| 7,191,451 B2 | 3/2007 | Nakagawa |
| 7,197,468 B1 | 3/2007 | Patricelli et al. |
| 7,206,768 B1 | 4/2007 | deGroeve et al. |
| 7,212,995 B2 | 5/2007 | Schulkins |
| 7,234,156 B2 | 6/2007 | French et al. |
| 7,234,160 B2 | 6/2007 | Vogel et al. |
| 7,236,950 B2 | 6/2007 | Savage et al. |
| 7,246,067 B2 | 7/2007 | Austin et al. |
| 7,246,068 B2 | 7/2007 | Thomas, Jr. |
| 7,249,076 B1 | 7/2007 | Pendleton et al. |
| 7,249,113 B1 | 7/2007 | Continelli et al. |
| 7,251,625 B2 | 7/2007 | Anglum |
| 7,263,497 B1 | 8/2007 | Wiser et al. |
| 7,277,869 B2 | 10/2007 | Starkman |
| 7,280,980 B1 | 10/2007 | Hoadley et al. |
| 7,281,652 B2 | 10/2007 | Foss |
| 7,289,971 B1 | 10/2007 | O'Neil et al. |
| 7,295,988 B1 | 11/2007 | Reeves |
| 7,298,872 B2 | 11/2007 | Glisson |
| 7,302,420 B2 | 11/2007 | Aggarwal et al. |
| 7,305,359 B2 | 12/2007 | Bonnell |
| 7,310,617 B1 | 12/2007 | Cunningham |
| 7,313,538 B2 | 12/2007 | Wilmes et al. |
| 7,328,276 B2 | 2/2008 | Alisuag |
| 7,333,937 B2 | 2/2008 | Baldwin, Jr. et al. |
| 7,340,424 B2 | 3/2008 | Gang et al. |
| 7,340,434 B2 | 3/2008 | Schnall |
| 7,343,295 B2 | 3/2008 | Pomerance |
| 7,346,576 B2 | 3/2008 | Lent et al. |
| 7,356,506 B2 | 4/2008 | Watson et al. |
| 7,356,516 B2 | 4/2008 | Richey et al. |
| 7,366,694 B2 | 4/2008 | Lazerson |
| 7,370,044 B2 | 5/2008 | Mulhern et al. |
| 7,379,913 B2 | 5/2008 | Steele et al. |
| 7,380,707 B1 | 6/2008 | Fredman |
| 7,383,988 B2 | 6/2008 | Slonecker, Jr. |
| 7,392,216 B1 | 6/2008 | Palmgren et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,433,864 B2 | 10/2008 | Malik |
| 7,451,113 B1 | 11/2008 | Kasower |
| 7,460,857 B2 | 12/2008 | Roach, Jr. |
| 7,467,401 B2 | 12/2008 | Cicchitto |
| 7,478,157 B2 | 1/2009 | Bohrer et al. |
| 7,479,949 B2 | 1/2009 | Jobs et al. |
| 7,490,356 B2 | 2/2009 | Lieblich et al. |
| 7,505,939 B2 | 3/2009 | Lent et al. |
| 7,527,967 B2 | 5/2009 | Chao et al. |
| 7,529,698 B2 | 5/2009 | Joao |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,552,080 B1 | 6/2009 | Willard et al. |
| 7,552,086 B1 | 6/2009 | Rajasekar et al. |
| 7,556,192 B2 | 7/2009 | Wokaty, Jr. |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,580,884 B2 | 8/2009 | Cook |
| 7,584,127 B2 | 9/2009 | Byrne et al. |
| 7,584,146 B1 | 9/2009 | Duhon |
| 7,587,366 B2 | 9/2009 | Grim, III et al. |
| 7,593,889 B2 | 9/2009 | Raines et al. |
| 7,593,891 B2 | 9/2009 | Kornegay et al. |
| 7,603,317 B2 | 10/2009 | Adler et al. |
| 7,603,701 B2 | 10/2009 | Gaucas |
| 7,606,725 B2 | 10/2009 | Robertson et al. |
| 7,610,229 B1 | 10/2009 | Kornegay |
| 7,617,116 B2 | 11/2009 | Amar et al. |
| 7,630,932 B2 | 12/2009 | Danaher et al. |
| 7,630,933 B2 | 12/2009 | Peterson et al. |
| 7,640,200 B2 | 12/2009 | Gardner et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,672,833 B2 | 3/2010 | Blume et al. |
| 7,676,410 B2 | 3/2010 | Petralia |
| 7,676,418 B1 | 3/2010 | Chung et al. |
| 7,689,505 B2 | 3/2010 | Kasower |
| 7,689,506 B2 | 3/2010 | Fei et al. |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,102 B2 | 4/2010 | Rothstein |
| 7,711,635 B2 | 5/2010 | Steele et al. |
| 7,711,636 B2 | 5/2010 | Robida et al. |
| 7,720,750 B2 | 5/2010 | Brody |
| 7,725,385 B2 | 5/2010 | Royer et al. |
| 7,729,959 B1 | 6/2010 | Wells et al. |
| 7,734,522 B2 | 6/2010 | Johnson et al. |
| 7,739,139 B2 | 6/2010 | Robertson et al. |
| 7,747,559 B2 | 6/2010 | Leitner et al. |
| 7,752,132 B2 | 7/2010 | Stewart et al. |
| 7,756,789 B2 | 7/2010 | Welker et al. |
| 7,765,311 B2 | 7/2010 | Itabashi et al. |
| 7,769,696 B2 | 8/2010 | Yoda |
| 7,769,998 B2 | 8/2010 | Lynch et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,783,562 B1 | 8/2010 | Ellis |
| 7,792,715 B1 | 9/2010 | Kasower |
| 7,797,725 B2 | 9/2010 | Lunt et al. |
| 7,801,807 B2 | 9/2010 | DeFrancesco et al. |
| 7,801,828 B2 | 9/2010 | Candella et al. |
| 7,805,345 B2 | 9/2010 | Abrahams et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,008 B1 | 11/2010 | Cole et al. |
| 7,848,972 B1 | 12/2010 | Sharma |
| 7,848,978 B2 | 12/2010 | Imrey et al. |
| 7,849,004 B2 | 12/2010 | Choudhuri et al. |
| 7,849,014 B2 | 12/2010 | Erikson |
| 7,853,493 B2 | 12/2010 | DeBie et al. |
| 7,853,518 B2 | 12/2010 | Cagan |
| 7,853,984 B2 | 12/2010 | Antell et al. |
| 7,856,386 B2 | 12/2010 | Hazlehurst et al. |
| 7,860,782 B2 | 12/2010 | Cash et al. |
| 7,860,786 B2 | 12/2010 | Blackburn et al. |
| 7,870,078 B2 | 1/2011 | Clark et al. |

(56) References Cited

U.S. PATENT DOCUMENTS

| | | |
|---|---|---|
| 7,877,304 B1 | 1/2011 | Coulter |
| 7,880,728 B2 | 2/2011 | de los Reyes et al. |
| 7,899,750 B1 | 3/2011 | Klieman et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,865 B2 | 3/2011 | Akerman et al. |
| 7,925,582 B1 | 4/2011 | Kornegay et al. |
| 7,930,195 B2 | 4/2011 | Heyns et al. |
| 7,930,252 B2 | 4/2011 | Bender et al. |
| 7,941,363 B2 | 5/2011 | Tanaka et al. |
| 7,966,192 B2 | 6/2011 | Pagliari et al. |
| 7,970,676 B2 | 6/2011 | Feinstein |
| 7,970,679 B2 | 6/2011 | Kasower |
| 7,970,698 B2 | 6/2011 | Gupta et al. |
| 7,979,908 B2 | 7/2011 | Millwee |
| 7,983,976 B2 | 7/2011 | Nafeh et al. |
| 7,983,979 B2 | 7/2011 | Holland, IV |
| 7,991,689 B1 | 8/2011 | Brunzell et al. |
| 8,001,034 B2 | 8/2011 | Chung et al. |
| 8,001,040 B2 | 8/2011 | Keithley |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,015,107 B2 | 9/2011 | Kornegay et al. |
| 8,019,828 B2 | 9/2011 | Cash et al. |
| 8,019,843 B2 | 9/2011 | Cash et al. |
| 8,024,778 B2 | 9/2011 | Cash et al. |
| 8,032,932 B2 | 10/2011 | Speyer et al. |
| 8,060,424 B2 | 11/2011 | Kasower |
| 8,060,441 B2 | 11/2011 | Stewart et al. |
| 8,064,586 B2 | 11/2011 | Shaffer et al. |
| 8,065,233 B2 | 11/2011 | Lee et al. |
| 8,065,234 B2 | 11/2011 | Liao et al. |
| 8,073,785 B1 | 12/2011 | Candella et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,082,202 B2 | 12/2011 | Weiss |
| 8,086,523 B1 | 12/2011 | Palmer |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,135,642 B1 | 3/2012 | Krause |
| 8,160,960 B1 | 4/2012 | Fei et al. |
| 8,195,549 B2 | 6/2012 | Kasower |
| 8,201,257 B1 | 6/2012 | Andres et al. |
| 8,204,774 B2 | 6/2012 | Chwast et al. |
| 8,204,812 B2 | 6/2012 | Stewart et al. |
| 8,219,535 B1 | 7/2012 | Kobori et al. |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,130 B1 | 8/2012 | Upstill et al. |
| 8,255,978 B2 | 8/2012 | Dick |
| 8,285,656 B1 | 10/2012 | Chang et al. |
| 8,290,840 B2 | 10/2012 | Kasower |
| 8,296,229 B1 | 10/2012 | Yellin et al. |
| 8,312,033 B1 | 11/2012 | McMillan |
| 8,321,334 B1 | 11/2012 | Kornegay et al. |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,340,685 B2 | 12/2012 | Cochran et al. |
| 8,355,967 B2 | 1/2013 | Debie et al. |
| 8,364,518 B1 | 1/2013 | Blake et al. |
| 8,364,588 B2 | 1/2013 | Celka et al. |
| 8,380,618 B2 | 2/2013 | Kazenas et al. |
| 8,412,593 B1 | 4/2013 | Song et al. |
| 8,418,254 B2 | 4/2013 | Britti et al. |
| 8,433,512 B1 | 4/2013 | Lopatenko et al. |
| 8,433,648 B2 | 4/2013 | Keithley et al. |
| 8,442,886 B1 | 5/2013 | Haggerty et al. |
| 8,458,062 B2 | 6/2013 | Dutt et al. |
| 8,458,074 B2 | 6/2013 | Showalter |
| 8,464,939 B1 | 6/2013 | Taylor et al. |
| 8,473,354 B2 | 6/2013 | Psota et al. |
| 8,515,844 B2 | 8/2013 | Kasower |
| 8,533,030 B1 | 9/2013 | Dhir et al. |
| 8,533,118 B2 | 9/2013 | Weller et al. |
| 8,560,436 B2 | 10/2013 | Ingram et al. |
| 8,566,029 B1 | 10/2013 | Lopatenko et al. |
| 8,566,141 B1 | 10/2013 | Nagdev et al. |
| 8,571,971 B1 | 10/2013 | Brown et al. |
| 8,572,083 B1 | 10/2013 | Snell et al. |
| 8,589,069 B1 | 11/2013 | Lehman |
| 8,589,208 B2 | 11/2013 | Kruger et al. |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,621,562 B2 | 12/2013 | Antell et al. |
| 8,626,618 B2 | 1/2014 | Psota et al. |
| 8,631,242 B2 | 1/2014 | Britti et al. |
| 8,639,616 B1 | 1/2014 | Rolenaitis et al. |
| 8,646,101 B1 | 2/2014 | Millwee |
| 8,650,407 B2 | 2/2014 | Britti et al. |
| 8,671,107 B2 | 3/2014 | Scully et al. |
| 8,671,115 B2 | 3/2014 | Skurtovich, Jr. et al. |
| 8,694,420 B1 | 4/2014 | Oliai |
| 8,719,159 B2 | 5/2014 | Keithley |
| 8,725,613 B1 | 5/2014 | Celka et al. |
| 8,738,516 B1 | 5/2014 | Dean et al. |
| 8,744,956 B1 | 6/2014 | DiChiara et al. |
| 8,756,099 B2 | 6/2014 | Keithley et al. |
| 8,768,914 B2 | 7/2014 | Scriffignano et al. |
| 8,775,299 B2 | 7/2014 | Achanta et al. |
| 8,781,882 B1 | 7/2014 | Arboletti et al. |
| 8,781,951 B2 | 7/2014 | Lewis et al. |
| 8,781,953 B2 | 7/2014 | Kasower |
| 8,806,218 B2 | 8/2014 | Hatakeda |
| 8,856,894 B1 | 10/2014 | Dean et al. |
| 8,930,251 B2 | 1/2015 | DeBie |
| 8,930,262 B1 | 1/2015 | Searson et al. |
| 8,931,058 B2 | 1/2015 | DiChiara et al. |
| 8,938,399 B1 | 1/2015 | Herman |
| 8,938,432 B2 | 1/2015 | Rossmark et al. |
| 8,949,981 B1 | 2/2015 | Trollope et al. |
| 9,043,930 B2 | 5/2015 | Britti et al. |
| 9,058,627 B1 | 6/2015 | Wasser et al. |
| 9,116,918 B1 | 8/2015 | Kim |
| 9,143,541 B1 | 9/2015 | Szamonek et al. |
| 9,147,042 B1 | 9/2015 | Haller et al. |
| 9,183,363 B1 | 11/2015 | Millwee |
| 9,189,789 B1 | 11/2015 | Hastings et al. |
| 9,251,541 B2 | 2/2016 | Celka et al. |
| 9,256,624 B2 | 2/2016 | Skurtovich, Jr. et al. |
| 9,256,904 B1 | 2/2016 | Haller et al. |
| 9,443,268 B1 | 9/2016 | Kapczynski et al. |
| 9,489,694 B2 | 11/2016 | Haller et al. |
| 9,553,936 B2 | 1/2017 | Dijk et al. |
| 9,558,519 B1 | 1/2017 | Burger |
| 9,607,336 B1 | 3/2017 | Dean et al. |
| 9,652,802 B1 | 5/2017 | Kasower |
| 9,684,905 B1 | 6/2017 | Haller et al. |
| 9,697,263 B1 | 7/2017 | Girulat, Jr. |
| 9,710,523 B2 | 7/2017 | Skurtovich, Jr. et al. |
| 9,760,553 B1 | 9/2017 | Hecht-Nielse |
| 9,792,648 B1 | 10/2017 | Haller et al. |
| 10,115,155 B1 | 10/2018 | Haller et al. |
| 10,362,058 B2 | 7/2019 | Hu et al. |
| 10,402,792 B2 | 9/2019 | Lin et al. |
| 10,417,704 B2 | 9/2019 | Searson et al. |
| 10,579,647 B1 | 3/2020 | Allsopp et al. |
| 10,650,448 B1 | 5/2020 | Haller et al. |
| 10,735,183 B1 | 8/2020 | Mehta et al. |
| 10,757,154 B1 | 8/2020 | Jacobs et al. |
| 10,909,617 B2 | 2/2021 | Kasower |
| 2001/0011247 A1 | 8/2001 | O'Flaherty et al. |

(56) References Cited

U.S. PATENT DOCUMENTS

| | | |
|---|---|---|
| 2001/0014868 A1 | 8/2001 | Herz et al. |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0034618 A1 | 10/2001 | Kessler et al. |
| 2001/0034631 A1 | 10/2001 | Kiselik |
| 2001/0039523 A1 | 11/2001 | Iwamoto |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049620 A1 | 12/2001 | Blasko |
| 2002/0004736 A1 | 1/2002 | Roundtree et al. |
| 2002/0004774 A1 | 1/2002 | Defarlo |
| 2002/0010594 A1 | 1/2002 | Levine |
| 2002/0026519 A1 | 2/2002 | Itabashi et al. |
| 2002/0042763 A1 | 4/2002 | Pillay et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0091650 A1 | 7/2002 | Ellis |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0107765 A1 | 8/2002 | Walker |
| 2002/0107849 A1 | 8/2002 | Hickey et al. |
| 2002/0111816 A1 | 8/2002 | Lortscher et al. |
| 2002/0116247 A1 | 8/2002 | Tucker et al. |
| 2002/0119824 A1 | 8/2002 | Allen |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138297 A1 | 9/2002 | Lee |
| 2002/0138470 A1 | 9/2002 | Zhou |
| 2002/0147617 A1 | 10/2002 | Schoenbaum et al. |
| 2002/0147669 A1 | 10/2002 | Taylor et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0161664 A1 | 10/2002 | Shaya et al. |
| 2002/0165757 A1 | 11/2002 | Lisser |
| 2002/0173994 A1 | 11/2002 | Ferguson, III |
| 2002/0174048 A1 | 11/2002 | Dheer et al. |
| 2002/0184054 A1 | 12/2002 | Cox et al. |
| 2002/0188478 A1 | 12/2002 | Breeland et al. |
| 2002/0194103 A1 | 12/2002 | Nabe |
| 2002/0194120 A1 | 12/2002 | Russell et al. |
| 2002/0198806 A1 | 12/2002 | Blagg et al. |
| 2002/0198830 A1 | 12/2002 | Randell et al. |
| 2003/0009418 A1 | 1/2003 | Green et al. |
| 2003/0009426 A1 | 1/2003 | Ruiz-Sanchez |
| 2003/0014336 A1 | 1/2003 | Dao et al. |
| 2003/0018558 A1 | 1/2003 | Heffner et al. |
| 2003/0027635 A1 | 2/2003 | Walker et al. |
| 2003/0028402 A1 | 2/2003 | Ulrich et al. |
| 2003/0036926 A1 | 2/2003 | Starkey et al. |
| 2003/0036995 A1 | 2/2003 | Lazerson |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0046112 A1 | 3/2003 | Dutta et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0097342 A1 | 5/2003 | Whittingtom |
| 2003/0097380 A1 | 5/2003 | Mulhern et al. |
| 2003/0110111 A1 | 6/2003 | Nalebuff et al. |
| 2003/0126072 A1 | 7/2003 | Brock |
| 2003/0154162 A1 | 8/2003 | Danaher et al. |
| 2003/0163416 A1 | 8/2003 | Kitajima |
| 2003/0163483 A1 | 8/2003 | Zingher et al. |
| 2003/0195859 A1 | 10/2003 | Lawrence |
| 2003/0204752 A1 | 10/2003 | Garrison |
| 2003/0208412 A1 | 11/2003 | Hillestad et al. |
| 2003/0220858 A1 | 11/2003 | Lam et al. |
| 2003/0229507 A1 | 12/2003 | Perge |
| 2003/0233259 A1 | 12/2003 | Mistretta et al. |
| 2004/0006488 A1 | 1/2004 | Fitall et al. |
| 2004/0010443 A1 | 1/2004 | May et al. |
| 2004/0010458 A1 | 1/2004 | Friedman |
| 2004/0023637 A1 | 2/2004 | Johnson et al. |
| 2004/0024709 A1 | 2/2004 | Yu et al. |
| 2004/0030629 A1 | 2/2004 | Freeman et al. |
| 2004/0030649 A1 | 2/2004 | Nelson et al. |
| 2004/0039688 A1 | 2/2004 | Sulkowski et al. |
| 2004/0044563 A1 | 3/2004 | Stein |
| 2004/0044673 A1 | 3/2004 | Brady et al. |
| 2004/0049473 A1 | 3/2004 | Gower et al. |
| 2004/0050928 A1 | 3/2004 | Bishop et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078323 A1 | 4/2004 | Johnston et al. |
| 2004/0078324 A1 | 4/2004 | Lonnberg et al. |
| 2004/0088237 A1 | 5/2004 | Moenickheim et al. |
| 2004/0088255 A1 | 5/2004 | Zielke et al. |
| 2004/0103147 A1 | 5/2004 | Flesher et al. |
| 2004/0111305 A1 | 6/2004 | Gavan et al. |
| 2004/0111359 A1 | 6/2004 | Hudock |
| 2004/0117235 A1 | 6/2004 | Shacham |
| 2004/0117302 A1 | 6/2004 | Weichert et al. |
| 2004/0128150 A1 | 7/2004 | Lundegren |
| 2004/0128230 A1 | 7/2004 | Oppenheimer et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0139025 A1 | 7/2004 | Coleman |
| 2004/0143546 A1 | 7/2004 | Wood et al. |
| 2004/0153437 A1 | 8/2004 | Buchan |
| 2004/0153521 A1 | 8/2004 | Kogo |
| 2004/0158523 A1 | 8/2004 | Dort |
| 2004/0159700 A1 | 8/2004 | Khan et al. |
| 2004/0167793 A1 | 8/2004 | Masuoka et al. |
| 2004/0177030 A1 | 9/2004 | Shoham |
| 2004/0177114 A1 | 9/2004 | Friedman et al. |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0225545 A1 | 11/2004 | Turner et al. |
| 2004/0225594 A1 | 11/2004 | Nolan, III et al. |
| 2004/0225597 A1 | 11/2004 | Oppenheimer et al. |
| 2004/0225643 A1 | 11/2004 | Alpha et al. |
| 2004/0230534 A1 | 11/2004 | McGough |
| 2004/0243450 A1 | 12/2004 | Bernard, Jr. et al. |
| 2004/0243588 A1 | 12/2004 | Tanner et al. |
| 2004/0267660 A1 | 12/2004 | Greenwood et al. |
| 2004/0267714 A1 | 12/2004 | Frid et al. |
| 2005/0004855 A1 | 1/2005 | Jenson et al. |
| 2005/0004870 A1 | 1/2005 | McGaughey |
| 2005/0010513 A1 | 1/2005 | Duckworth et al. |
| 2005/0027633 A1 | 2/2005 | Fortuna et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0055275 A1 | 3/2005 | Newman et al. |
| 2005/0058262 A1 | 3/2005 | Timmins et al. |
| 2005/0071328 A1 | 3/2005 | Lawrence |
| 2005/0086071 A1 | 4/2005 | Fox, Jr. et al. |

(56) References Cited

U.S. PATENT DOCUMENTS

| | | |
|---|---|---|
| 2005/0086072 A1 | 4/2005 | Fox, Jr. et al. |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102206 A1 | 5/2005 | Savasoglu et al. |
| 2005/0125291 A1 | 6/2005 | Demkiw Grayson et al. |
| 2005/0125397 A1 | 6/2005 | Gross et al. |
| 2005/0137899 A1 | 6/2005 | Davies et al. |
| 2005/0137912 A1 | 6/2005 | Rao et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0197953 A1 | 9/2005 | Broadbent et al. |
| 2005/0209880 A1 | 9/2005 | Drelicharz et al. |
| 2005/0209922 A1 | 9/2005 | Hofmeister |
| 2005/0228748 A1 | 10/2005 | Togher et al. |
| 2005/0251474 A1 | 11/2005 | Shinn et al. |
| 2005/0267840 A1 | 12/2005 | Holm-Blagg et al. |
| 2005/0273423 A1 | 12/2005 | Kiai et al. |
| 2005/0273431 A1 | 12/2005 | Abel et al. |
| 2005/0279827 A1 | 12/2005 | Mascavage et al. |
| 2005/0288998 A1 | 12/2005 | Verma et al. |
| 2006/0004654 A1 | 1/2006 | Kornegay et al. |
| 2006/0014129 A1 | 1/2006 | Coleman et al. |
| 2006/0015425 A1 | 1/2006 | Brooks |
| 2006/0029107 A1 | 2/2006 | McCullough et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0059086 A1 | 3/2006 | Mulhern |
| 2006/0069635 A1 | 3/2006 | Ram et al. |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0085334 A1 | 4/2006 | Murphy |
| 2006/0089842 A1 | 4/2006 | Medawar |
| 2006/0095363 A1 | 5/2006 | May |
| 2006/0100944 A1 | 5/2006 | Reddin et al. |
| 2006/0100954 A1 | 5/2006 | Schoen |
| 2006/0106670 A1 | 5/2006 | Cai et al. |
| 2006/0123461 A1 | 6/2006 | Lunt et al. |
| 2006/0131390 A1 | 6/2006 | Kim |
| 2006/0155573 A1 | 7/2006 | Hartunian |
| 2006/0155639 A1 | 7/2006 | Lynch et al. |
| 2006/0173772 A1 | 8/2006 | Hayes et al. |
| 2006/0177226 A1 | 8/2006 | Ellis, III |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0184440 A1 | 8/2006 | Britti et al. |
| 2006/0184585 A1 | 8/2006 | Grear et al. |
| 2006/0202012 A1 | 9/2006 | Grano et al. |
| 2006/0204051 A1 | 9/2006 | Holland, IV |
| 2006/0212407 A1 | 9/2006 | Lyon |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0235743 A1 | 10/2006 | Long et al. |
| 2006/0242046 A1 | 10/2006 | Haggerty et al. |
| 2006/0271457 A1 | 11/2006 | Romain et al. |
| 2006/0277092 A1 | 12/2006 | Williams |
| 2006/0277141 A1 | 12/2006 | Palmer |
| 2006/0278704 A1 | 12/2006 | Saunders et al. |
| 2006/0282359 A1 | 12/2006 | Nobili et al. |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0011083 A1 | 1/2007 | Bird et al. |
| 2007/0016500 A1 | 1/2007 | Chatterji et al. |
| 2007/0016517 A1 | 1/2007 | Solomon |
| 2007/0016520 A1 | 1/2007 | Gang et al. |
| 2007/0022141 A1 | 1/2007 | Singleton et al. |
| 2007/0027778 A1 | 2/2007 | Schellhammer et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0043654 A1 | 2/2007 | Libman |
| 2007/0045402 A1 | 3/2007 | Rothschild |
| 2007/0045405 A1 | 3/2007 | Rothschild |
| 2007/0067207 A1 | 3/2007 | Haggerty et al. |
| 2007/0067297 A1 | 3/2007 | Kublickis |
| 2007/0083460 A1 | 4/2007 | Bachenheimer |
| 2007/0083463 A1 | 4/2007 | Kraft |
| 2007/0088950 A1 | 4/2007 | Wheeler et al. |
| 2007/0094137 A1 | 4/2007 | Phillips et al. |
| 2007/0094230 A1 | 4/2007 | Subramaniam et al. |
| 2007/0094241 A1 | 4/2007 | M. Blackwell et al. |
| 2007/0106582 A1 | 5/2007 | Baker et al. |
| 2007/0112668 A1 | 5/2007 | Celano et al. |
| 2007/0118410 A1 | 5/2007 | Nadal |
| 2007/0130070 A1 | 6/2007 | Williams |
| 2007/0156692 A1 | 7/2007 | Rosewarne |
| 2007/0162414 A1 | 7/2007 | Horowitz et al. |
| 2007/0192121 A1 | 8/2007 | Routson et al. |
| 2007/0192122 A1 | 8/2007 | Routson et al. |
| 2007/0198336 A1 | 8/2007 | Thompson |
| 2007/0198407 A1 | 8/2007 | Winter |
| 2007/0208640 A1 | 9/2007 | Banasiak et al. |
| 2007/0214000 A1 | 9/2007 | Shahrabi et al. |
| 2007/0226047 A1 | 9/2007 | Ward |
| 2007/0226093 A1 | 9/2007 | Chan et al. |
| 2007/0250459 A1 | 10/2007 | Schwarz et al. |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0261114 A1 | 11/2007 | Pomerantsev |
| 2007/0262137 A1 | 11/2007 | Brown |
| 2007/0266439 A1 | 11/2007 | Kraft |
| 2007/0279187 A1 | 12/2007 | Hekmatpour et al. |
| 2007/0282730 A1 | 12/2007 | Carpenter et al. |
| 2007/0284433 A1 | 12/2007 | Domenica et al. |
| 2007/0288360 A1 | 12/2007 | Seeklus |
| 2007/0294195 A1 | 12/2007 | Curry et al. |
| 2007/0294431 A1 | 12/2007 | Adelman et al. |
| 2007/0299699 A1 | 12/2007 | Policelli et al. |
| 2008/0010203 A1 | 1/2008 | Grant |
| 2008/0010206 A1 | 1/2008 | Coleman |
| 2008/0015979 A1 | 1/2008 | Bentley |
| 2008/0022281 A1 | 1/2008 | Dubhashi et al. |
| 2008/0033742 A1 | 2/2008 | Bernasconi |
| 2008/0046351 A1 | 2/2008 | Wiener et al. |
| 2008/0052182 A1 | 2/2008 | Marshall |
| 2008/0052244 A1 | 2/2008 | Tsuei et al. |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0086400 A1 | 4/2008 | Ardelean et al. |
| 2008/0091519 A1 | 4/2008 | Foss |
| 2008/0097768 A1 | 4/2008 | Godshalk |
| 2008/0103959 A1 | 5/2008 | Carroll et al. |
| 2008/0103972 A1 | 5/2008 | Lanc |
| 2008/0109315 A1 | 5/2008 | Huang et al. |
| 2008/0109740 A1 | 5/2008 | Prinsen et al. |
| 2008/0109875 A1 | 5/2008 | Kraft |
| 2008/0115191 A1 | 5/2008 | Kim et al. |
| 2008/0120133 A1 | 5/2008 | Krishnaswami et al. |
| 2008/0162383 A1 | 7/2008 | Kraft |
| 2008/0172324 A1 | 7/2008 | Johnson |
| 2008/0177655 A1 | 7/2008 | Zalik |
| 2008/0184270 A1 | 7/2008 | Cole et al. |
| 2008/0189202 A1 | 8/2008 | Zadoorian et al. |
| 2008/0195548 A1 | 8/2008 | Chu et al. |
| 2008/0201257 A1 | 8/2008 | Lewis et al. |
| 2008/0205655 A1 | 8/2008 | Wilkins et al. |
| 2008/0205774 A1 | 8/2008 | Brinker et al. |
| 2008/0208610 A1 | 8/2008 | Thomas et al. |
| 2008/0208726 A1 | 8/2008 | Tsantes et al. |
| 2008/0208873 A1 | 8/2008 | Boehmer |

(56) References Cited

U.S. PATENT DOCUMENTS

| | | |
|---|---|---|
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0255922 A1 | 10/2008 | Feldman et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0306750 A1 | 12/2008 | Wunder et al. |
| 2008/0319832 A1 | 12/2008 | Liebe |
| 2008/0319889 A1 | 12/2008 | Hammad |
| 2008/0319909 A1 | 12/2008 | Perkins et al. |
| 2009/0012889 A1 | 1/2009 | Finch |
| 2009/0024428 A1 | 1/2009 | Hudock, Jr. |
| 2009/0030776 A1 | 1/2009 | Walker et al. |
| 2009/0031426 A1 | 1/2009 | Dal Lago et al. |
| 2009/0043691 A1 | 2/2009 | Kasower |
| 2009/0044279 A1 | 2/2009 | Crawford et al. |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0089190 A1 | 4/2009 | Girulat |
| 2009/0094674 A1 | 4/2009 | Schwartz et al. |
| 2009/0112650 A1 | 4/2009 | Iwane |
| 2009/0119199 A1 | 5/2009 | Salahi |
| 2009/0138335 A1 | 5/2009 | Lieberman |
| 2009/0150166 A1 | 6/2009 | Leite et al. |
| 2009/0150238 A1 | 6/2009 | Marsh et al. |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172815 A1 | 7/2009 | Gu et al. |
| 2009/0222308 A1 | 9/2009 | Zoldi et al. |
| 2009/0222379 A1 | 9/2009 | Choudhuri et al. |
| 2009/0234775 A1 | 9/2009 | Whitney et al. |
| 2009/0240624 A1 | 9/2009 | James et al. |
| 2009/0248573 A1 | 10/2009 | Haggerty et al. |
| 2009/0254971 A1 | 10/2009 | Herz et al. |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0289110 A1 | 11/2009 | Regen et al. |
| 2009/0319411 A1 | 12/2009 | DeBie et al. |
| 2009/0328173 A1 | 12/2009 | Jakobson et al. |
| 2010/0009663 A1 | 1/2010 | Chang |
| 2010/0011428 A1 | 1/2010 | Atwood et al. |
| 2010/0023434 A1 | 1/2010 | Bond |
| 2010/0023448 A1 | 1/2010 | Eze |
| 2010/0030677 A1 | 2/2010 | Melik-Aslanian et al. |
| 2010/0042517 A1 | 2/2010 | Paintin et al. |
| 2010/0042583 A1 | 2/2010 | Gervais |
| 2010/0049803 A1 | 2/2010 | Ogilvie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0122316 A1 | 5/2010 | Lyon |
| 2010/0142698 A1 | 6/2010 | Spottiswoode et al. |
| 2010/0145836 A1 | 6/2010 | Baker et al. |
| 2010/0174638 A1 | 7/2010 | Debie et al. |
| 2010/0185546 A1 | 7/2010 | Pollard |
| 2010/0188684 A1 | 7/2010 | Kumara |
| 2010/0205087 A1 | 8/2010 | Hubler et al. |
| 2010/0217837 A1 | 8/2010 | Ansari et al. |
| 2010/0223168 A1 | 9/2010 | Haggerty et al. |
| 2010/0228658 A1 | 9/2010 | Ketelsen et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0262535 A1 | 10/2010 | Lent et al. |
| 2010/0268660 A1 | 10/2010 | Ekdahl |
| 2010/0293090 A1 | 11/2010 | Domenikos et al. |
| 2010/0299262 A1 | 11/2010 | Handler |
| 2011/0029427 A1 | 2/2011 | Haggerty et al. |
| 2011/0035315 A1 | 2/2011 | Langley |
| 2011/0040736 A1 | 2/2011 | Kalaboukis |
| 2011/0054981 A1 | 3/2011 | Faith et al. |
| 2011/0060654 A1 | 3/2011 | Elliott et al. |
| 2011/0125632 A1 | 5/2011 | Neel |
| 2011/0126275 A1 | 5/2011 | Anderson et al. |
| 2011/0131123 A1 | 6/2011 | Griffin et al. |
| 2011/0161218 A1 | 6/2011 | Swift |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0184838 A1 | 7/2011 | Winters et al. |
| 2011/0196791 A1 | 8/2011 | Dominguez |
| 2011/0270779 A1 | 11/2011 | Showalter |
| 2011/0270925 A1 | 11/2011 | Mina |
| 2012/0005070 A1 | 1/2012 | McFall et al. |
| 2012/0023011 A1 | 1/2012 | Hurwitz |
| 2012/0030771 A1 | 2/2012 | Pierson et al. |
| 2012/0066065 A1 | 3/2012 | Switzer |
| 2012/0066084 A1 | 3/2012 | Sneyders |
| 2012/0066116 A1 | 3/2012 | Kornegay et al. |
| 2012/0072464 A1 | 3/2012 | Cohen |
| 2012/0095894 A1 | 4/2012 | Campbell et al. |
| 2012/0101938 A1 | 4/2012 | Kasower |
| 2012/0101939 A1 | 4/2012 | Kasower |
| 2012/0108274 A1 | 5/2012 | Acebo Ruiz et al. |
| 2012/0109990 A1 | 5/2012 | Yamasaki |
| 2012/0123942 A1 | 5/2012 | Song et al. |
| 2012/0136763 A1 | 5/2012 | Megdal et al. |
| 2012/0136774 A1 | 5/2012 | Imrey et al. |
| 2012/0158574 A1 | 6/2012 | Brunzell et al. |
| 2012/0158654 A1 | 6/2012 | Behren et al. |
| 2012/0173406 A1 | 7/2012 | Fei et al. |
| 2012/0173417 A1 | 7/2012 | Lohman et al. |
| 2012/0198556 A1 | 8/2012 | Patel et al. |
| 2012/0204026 A1 | 8/2012 | Shi et al. |
| 2012/0215682 A1 | 8/2012 | Lent et al. |
| 2012/0226916 A1 | 9/2012 | Hahn et al. |
| 2012/0232958 A1 | 9/2012 | Silbert |
| 2012/0239553 A1 | 9/2012 | Gonen et al. |
| 2012/0239583 A1 | 9/2012 | Dobrowolski |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0284118 A1 | 11/2012 | Mamich, Jr. et al. |
| 2012/0290660 A1 | 11/2012 | Rao et al. |
| 2012/0317016 A1 | 12/2012 | Hughes |
| 2012/0324388 A1 | 12/2012 | Rao et al. |
| 2013/0018811 A1 | 1/2013 | Britti et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0110565 A1 | 5/2013 | Means et al. |
| 2013/0117087 A1 | 5/2013 | Coppinger |
| 2013/0124263 A1 | 5/2013 | Amaro et al. |
| 2013/0173449 A1 | 7/2013 | Ng et al. |
| 2013/0173451 A1 | 7/2013 | Kornegay et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0268357 A1 | 10/2013 | Heath |
| 2013/0332338 A1 | 12/2013 | Yan et al. |
| 2013/0332342 A1 | 12/2013 | Kasower |
| 2013/0332467 A1 | 12/2013 | Bornea et al. |
| 2013/0339249 A1 | 12/2013 | Weller et al. |
| 2014/0032265 A1* | 1/2014 | Paprocki ............ G06Q 30/0201 705/7.29 |
| 2014/0032300 A1 | 1/2014 | Zhang et al. |
| 2014/0032723 A1 | 1/2014 | Nema |
| 2014/0061302 A1 | 3/2014 | Hammad |
| 2014/0089167 A1 | 3/2014 | Kasower |
| 2014/0110477 A1 | 4/2014 | Hammad |
| 2014/0136422 A1 | 5/2014 | Jung et al. |

(56) References Cited

U.S. PATENT DOCUMENTS

| | | | |
|---|---|---|---|
| 2014/0156500 A1 | 6/2014 | Lassen et al. | |
| 2014/0156501 A1 | 6/2014 | Howe | |
| 2014/0156503 A1 | 6/2014 | Lassen et al. | |
| 2014/0157375 A1 | 6/2014 | Britti et al. | |
| 2014/0258083 A1 | 9/2014 | Achanta et al. | |
| 2014/0279329 A1 | 9/2014 | Dancel | |
| 2015/0254329 A1 | 9/2015 | Agarwal et al. | |
| 2015/0269506 A1 | 9/2015 | Britti et al. | |
| 2015/0287091 A1 | 10/2015 | Koran | |
| 2015/0295906 A1 | 10/2015 | Ufford et al. | |
| 2015/0310543 A1 | 10/2015 | DeBie | |
| 2015/0339769 A1* | 11/2015 | deOliveira | G06Q 40/025 705/38 |
| 2016/0055487 A1 | 2/2016 | Votaw et al. | |
| 2016/0071175 A1 | 3/2016 | Reuss et al. | |
| 2016/0092997 A1 | 3/2016 | Shen et al. | |
| 2017/0041296 A1* | 2/2017 | Ford | G06F 21/64 |
| 2017/0046526 A1 | 2/2017 | Chan et al. | |
| 2017/0046652 A1 | 2/2017 | Haldenby et al. | |
| 2017/0046664 A1 | 2/2017 | Haldenby et al. | |
| 2017/0046693 A1 | 2/2017 | Haldenby et al. | |
| 2017/0048021 A1 | 2/2017 | Yanovsky et al. | |
| 2017/0061138 A1* | 3/2017 | Lambert | H04L 63/18 |
| 2017/0109735 A1 | 4/2017 | Sheng et al. | |
| 2017/0200223 A1 | 7/2017 | Kasower | |
| 2017/0249481 A1 | 8/2017 | Edison | |
| 2017/0278182 A1 | 9/2017 | Kasower | |
| 2018/0060596 A1 | 3/2018 | Hamel et al. | |
| 2018/0060600 A1 | 3/2018 | Hamel et al. | |
| 2018/0062835 A1 | 3/2018 | Hamel et al. | |
| 2018/0183768 A1 | 6/2018 | Lobban et al. | |
| 2018/0205707 A1 | 7/2018 | Bellala et al. | |
| 2018/0218069 A1 | 8/2018 | Rege et al. | |
| 2018/0239914 A1 | 8/2018 | Chen et al. | |
| 2018/0253702 A1 | 9/2018 | Dowding | |
| 2018/0276661 A1* | 9/2018 | van Wingerden | G06Q 20/383 |
| 2018/0302215 A1 | 10/2018 | Salgueiro et al. | |
| 2018/0309567 A1 | 10/2018 | Wooden | |
| 2019/0251558 A1* | 8/2019 | Liu | G06Q 20/389 |
| 2019/0347627 A1 | 11/2019 | Lin et al. | |
| 2020/0143363 A1 | 5/2020 | Schmidt | |
| 2020/0153627 A1* | 5/2020 | Wentz | H04L 9/3239 |
| 2020/0211103 A1 | 7/2020 | Searson et al. | |
| 2021/0065160 A1 | 3/2021 | Butvin et al. | |

FOREIGN PATENT DOCUMENTS

| | | |
|---|---|---|
| CN | 102663650 | 9/2012 |
| EP | 0 554 083 | 8/1993 |
| EP | 0 919 942 | 6/1999 |
| EP | 1 028 401 | 8/2000 |
| EP | 1 988 501 | 11/2008 |
| GB | 1 322 809 | 7/1973 |
| KR | 10-2004-0078798 | 9/2004 |
| KR | 10-2013-0107394 | 10/2013 |
| RU | 2 181 216 | 4/2002 |
| WO | WO 94/012943 | 6/1994 |
| WO | WO 95/012857 | 5/1995 |
| WO | WO 99/046710 | 9/1999 |
| WO | WO 00/055778 | 9/2000 |
| WO | WO 00/065469 | 11/2000 |
| WO | WO 01/004821 | 1/2001 |
| WO | WO 01/039589 | 6/2001 |
| WO | WO 01/041355 | 6/2001 |
| WO | WO 01/084281 | 11/2001 |
| WO | WO 02/013047 | 2/2002 |
| WO | WO 02/071176 | 9/2002 |
| WO | WO 2004/114160 | 12/2004 |
| WO | WO 2005/022348 | 3/2005 |
| WO | WO 2005/124619 | 12/2005 |
| WO | WO 2006/099081 | 9/2006 |
| WO | WO 2007/004158 | 1/2007 |
| WO | WO 2008/021061 | 2/2008 |
| WO | WO 2008/147918 | 12/2008 |
| WO | WO 2009/117468 | 9/2009 |
| WO | WO 2013/009920 | 1/2013 |
| WO | WO 2014/088895 | 6/2014 |
| WO | WO 2014/137759 | 9/2014 |
| WO | WO 2018/144612 | 8/2018 |
| WO | WO 2020/146667 | 7/2020 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
"ACS Company Birch & Davis Wins Texas CHIP Contract," PR Newswire, Section: Financial News, May 17, 2000, Dallas, TX, pp. 3.
Aharony et al., "Social Area Networks: Data Networking of the People, by the People, for the People," 2009 International Conference on Computational Science and Engineering, May 2009, pp. 1148-1155.
"An Even Better Solution to Financing Elective Surgery . . . ", Unicorn Financial, pp. 7, http://web.archive.org/web/20000816161359/http://www.unicornfinancial.com/, as downloaded Oct. 15, 2008.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 2 pages.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Antonopoulos, Andreas M., "Mastering Bitcoin: Unlocking Digital Crypto-Currencies", O'Reilly, Dec. 2014, First Edition, pp. 282.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
"Beverly Hills Man Convicted of Operating 'Bust-Out' Schemes that Caused More than $8 Million in Losses", Department of Justice, Jul. 25, 2006, 2 Pgs.
Bienkowski, Nik, "A New Tool for Portfolio Risk Management—Gold Bullion", Apr. 2003, pp. 6.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Burr Ph.D., et al., "Utility Payments as Alternative Credit Data: A Reality Check", Asset Builders of America, Inc., Oct. 5, 2006, pp. 1-18, Washington, D.C.
"Bust-Out Schemes", Visual Analytics Inc. Technical Product Support, Newsletter vol. 4, Issue 1, Jan. 2005, pp. 7.
Calnan, Christopher, "Tenet, Fair Isaac invest $20M in startup," MHT, Mass High Tech: The Journal of New England Technology, dated Jul. 23, 2007, 2 pgs.
Capps et al., "Recent Changes in Texas Welfare and Work, Child Care and Child Welfare Systems," Assessing the New Federalism, The Urban Institute, State Update No. 1, 24 pgs., Jun. 2001.

(56) References Cited

OTHER PUBLICATIONS

CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Cheney, Karen, "Fix Your Nose, If You Wish, but Not With This New Loan," Money Magazine, vol. 27, No. 5, 1 pg., dated May 1, 1998.
CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/printed Dec. 2, 2011 in 1 page.
CreditToolkit, Digital Matrix Systems, as printed out Mar. 4, 2008, pp. 2.
"Credit Information Bureaus and 'CIBIL'", http://www.icicibank.com/cibil.html printed Aug. 22, 2012 in 3 pages.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
"Debt Settlement: Watch Video on how to Pay Your Debt Faster", http://www.debtconsolidationcare.com/debt-settlement.html printed Jan. 9, 2013 in 6 pages.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
Dibartolomeo, Dan, "Portfolio Optimization: The Robust Solution," Prudential Securities Quantitative Conference, Dec. 21, 1993, pp. 8.
Dietz, Ellen, "Dental Office Management," 8 pg., pp. 316-321, Copyright 2000.
Downes et al., Dictionary of Finance and Investment Terms, Fifth Edition, 1998, pp. 332-333.
Dymi, Amilda, Need for Leads Spurs Some Upgrades, Origination News-Special Report, May 1, 2008, vol. vol. 17, Issue No. 8, pp. 24, Atlanta, Copyright 2008 SourceMedia, Inc.
EFunds Introduces QualiFileSM, Deluxe Corporation, eFunds Press Release and Product Launch, Sep. 23, 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Equifax Consumer Credit Report http://www.equifax.com/home/, as retrieved on Sep. 17, 2008.
Ettorre, "Paul Kahn on Exceptional Marketing," Management Review, vol. 83, No. 11, Nov. 1994, pp. 48-51.
Expensr.com http://www.expensr.com/, as retrieved on Sep. 17, 2008.
Experian Consumer Credit Report http://www.experian.com/, as retrieved on Sep. 17, 2008.
Experian, Custom Strategist and Qualifile from Funds, 2000, in 2 pages.
Experian, "Enabling e-business", White Paper, Jan. 2001, pp. 21.
Experian, "Instant Prescreen: Offer preapproved credit at the point of sale", Oct. 2000, pp. 2, http://www.cdillinois.com/pdf_file/instant_prescreen_ps.pdf.
Experian, "Experian Rental Payment Data," http://www.experian.com/rentbureau/rental-data.html printed Nov. 22, 2013 in 2 pages.
FamilySecure.com; "Identity Theft Protection for the Whole Family | FamilySecure.com" http://www.familysecure.com/, as retrieved on Nov. 5, 2009.
Felsenthal, Edward, "Health Costs; Managed Care Helps Curb Costs, Study Says," The Wall Street Journal, dated Aug. 12, 1991.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
"Fighting the New Face of Fraud", FinanceTech, http://www.financetech.com/showArticle.jhtml?articleID=167100405, Aug. 2, 2005.
"Financing Medical Procedures a Lucrative but Risky Business," Credit Risk Management Report, vol. 10, Issue 15, 2 pgs., dated Aug. 7, 2000.
Fisher, Joseph, "Access to Fair Credit Reports: Current Practices and Proposed Legislation," American Business Law Journal, Fall 1981, vol. 19, No. 3, p. 319.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gilje, Shelby, "Credit Agency Moving Into Health Care," NewsRoom, The Seattle Times, Section: Scene, Mar. 22, 1995, pp. 3, http://web2.westlaw.com/result/documenttext.aspx?rs=WLW8.03&ss+CNT&rp=%2fWelc . . . .
Gionis et al., "Similarity Search in High Dimensions via Hashing", Sep. 7, 1999, pp. 518-529.
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, 2008, pp. 3.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Henry, M.D., Kimberly A., "The Face-Lift Sourcebook," copyright 2000, 3 pgs. (p. 207).
Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.
ID Analytics, "ID Analytics® Consumer Notification Service" printed Apr. 16, 2013 in 2 pages.
Ideon, Credit-Card Registry that Bellyflopped this Year, Is Drawing some Bottom-Fishers, The Wall Street Journal, Aug. 21, 1995, pp. C2.
"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.
IndiCareTM, On-Line Patient Assistant Program, Website Users Manual, JBI Associates, LLC, 1997.
Kent, Heather, "Huge declines in price as competition heats up in Vancouver's booming laser-surgery market," CMAJ, Oct. 5, 1999; 161 (7), pp. 857-858.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lavelle, Marianne, "Health Plan Debate Turning to Privacy Some Call for Safeguards on Medical Disclosure. Is a Federal Law

(56) References Cited

OTHER PUBLICATIONS

Necessary?," The National Law Journal, vol. 16, No. 39, dated May 30, 1994, as downloaded from http://web2.westlaw.com/result/.
LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
Littwin, Angela, "Beyond Usury: A Study of Credit-Card Use and Preference Among Low-Income Consumers", Texas Law Review, vol. 86, No. 3, pp. 451-506; Feb. 2008.
Lorette, Kristie, "How to Successfully Dispute Inaccuracies on Your Credit Report," http://web.archive.org/web/20110531184149/http://www.quizzle.com/blog/2011/03/how-to-successfully-dispute-inaccuracies-on-your-credit-report/, Mar. 25, 2011, in * pages.
Magid, Lawrence, J., Business Tools: When Selecting an ASP Ensure Data Mobility, Los Angeles Times, Los Angeles, CA, Feb. 26, 2001, vol. C, Issue 4, pp. 3.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
"MediCredit Announces Major Investment from Medstone; Financing Will Enable Dramatic Expansion of Online Services," Business Wire, pp. 2, dated May 12, 2000.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.
Menge, Falko, "Enterprise Service Bus", Free and Open Source Software Conference, 2007, pp. 6.
Merriam Webster's Collegiate Dictionary, 10th Edition, 1999, p. 79.
Microbilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.
Mint.com, http://www.mint.com/ printed Sep. 18, 2008 in 2 pages.
MS Money Software by Microsoft http://www.microsoft.com/Money/default.mspx as retrieved on Sep. 17, 2008.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W...&VR=2.0 as printed Dec. 17, 2009, pp. 5.
NewsRoom, "CIGNA Report Withdrawn as Foe Sees Opening," Insurance Regulator, State Survey, Sep. 9, 1996, vol. 8, Issue 34, pp. 4.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
Organizing Maniac's Blog—Online Receipts Provided by MyQuickReceipts.com, http://organizingmaniacs.wordpress.eom/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.
"Recognition and use by Appraisers of Energy-Performance Benchmarking Tools for Commercial Buildings," prepared by the Institute for Market Transformation, NYSERDA, Feb. 2003, pp. 6.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Roth, Andrew, "CheckFree to Introduce E-Mail Billing Serving," American Banker, New York, Mar. 13, 2001, vol. 166, No. 49, pp. 3.
Rubin, Rita, "Cosmetic Surgery on Credit, Finance plans let patients reconstruct now, pay later," The Dallas Morning News, 2 pgs., dated Sep. 10, 1988.
Screenshot for Investment Account Manager v.2.8.3, published at http://www.aaii.com/objects/get/1642.gif by at least Aug. 30, 2011 in 1 page.
SearchAmerica, "Payment Advisor Suite TM", Solutions, 2009, pp. 2.

(56) References Cited

OTHER PUBLICATIONS

Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.
"Settling Your Debts—Part 1 in Our Debt Settlement Series", http://www.creditinfocenter.com/debt/settle_debts.shtml printed Jan. 9, 2013 in 6 pages.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright© Glyn Simpson 1998-2007, http://web.archive.org/web/20071018075531/http://money.mvps.org/faq/article/196.aspx.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
State of Wisconsin, Division of Health Care Financing, Department of Health and Family Services: 1999-2001 Biennial Report, pp. 17-21.
Stein, Benchmarking Default Prediction Models: Pitfalls and Remedies in Model Validation, Moody's KMV, Revised Jun. 13, 2002, Technical Report #020305; New York.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
Thomas, David, "Reporton Networks and Electronic Communications Newcourt Credit Turns to Extranet Services / A PC Connects to 1,200 Users at Once", The Globe and Mail (Canada), Section: Report on Business Special Report, Nov. 12, 1996, pp. 2.
TRAkkER Corporation website, trakkercorp.com, TRAkkER Software Description, May 26, 2000, available at http://web.archive.org/web/20000526234204/http://trakkercorp.com/page4.html.
TransUnion Consumer Credit Report http://www.transunion.com/, as retrieved on Sep. 17, 2008.
US Legal, Description, http://www.uslegalforms.com/us/US-00708-LTR.htm printed Sep. 4, 2007 in 2 pages.
Washington State Office of Public Defense, "Criteria and Standards for Determining and Verifying Indigency," dated Feb. 9, 2001.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
Wesabe.com http://www.wesabe.com/, as retrieved on Sep. 17, 2008.
White, Ron, "How Computers Work", Special 10th Anniversary, Seventh Edition, Que Corporation, Indianapolis, IN, Oct. 2003, pp. 23.
Wilson, Andrea, "Escaping the Alcatraz of Collections and Charge-Offs", http://www.transactionworld.net/articles/2003/october/riskMgmt1.asp, Oct. 2003.
Window on State Government, Susan Combs, Texas Comptroller of Public Accounts, Chapters: Health and Human Services, "Improve the Medicaid Eligibility Determination Process," 9 pgs., as downloaded at http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Zoot—Decision Engine, www.zootweb.com/decision_engine.html, as printed on Mar. 3, 2008.
Zoot—Pre-Built Standard Attributes, www.zootweb.com/credit_attributes.html as printed Mar. 3, 2008.
Official Communication in Australian Patent Application No. 2012281182, dated Jul. 8, 2014.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Nov. 25, 2014.
Official Communication in European Patent Application No. 12811546.6, dated Sep. 18, 2015.
Official Communication in Indian Patent Application No. 490/DELNP/2014, dated Jun. 20, 2019.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
Official Communication in Australian Patent Application No. 2013356451, dated Jun. 22, 2015.
Official Communication in Chinese Patent Application No. 201380006862.9, dated Aug. 2, 2016.
Official Communication in European Patent Application No. 13860724.7, dated May 21, 2015.
Official Communication in Russian Patent Application No. 2014127000, dated Dec. 23, 2015.
International Search Report and Written Opinion for Application No. PCT/US2013/072102, dated Apr. 18, 2014.
International Preliminary Report on Patentability and Written Opinion for Application No. PCT/US2013/072102, dated Jun. 9, 2015.
Official Communication in Australian Patent Application No. 2014203430, dated Aug. 15, 2015.
Official Communication in Chinese Patent Application No. 201480000626.0, dated Aug. 1, 2016.
Official Communication in European Patent Application No. 14733951.9, dated Sep. 11, 2015.
Official Communication in Russian Patent Application No. 2014127320, dated Jul. 5, 2016.
International Search Report and Written Opinion for Application No. PCT/US2014/019142, dated Jun. 20, 2014.
International Preliminary Report on Patentability and Written Opinion for Application No. PCT/US2014/019142, dated Sep. 17, 2015.
International Search Report and Written Opinion for Application No. PCT/US2017/048265, dated Dec. 5, 2017.
International Preliminary Report on Patentability in Application No. PCT/US2017/048265, dated Mar. 7, 2019.
Extended European Search Report for Application No. EP12747205, dated May 14, 2020.
International Search Report and Written Opinion for Application No. PCT/US2018/016258, dated May 16, 2018.
International Preliminary Report on Patentability in Application No. PCT/US2018/016258, dated Aug. 15, 2019.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Application as filed in U.S. Appl. No. 09/653,595, dated Aug. 31, 2000.

(56) References Cited

OTHER PUBLICATIONS

Extended European Search Report for Application No. EP12747205, dated Aug. 14, 2020.
Fan et al., "Design of Customer Credit Evaluation System for E-Business", 2004 IEEE International Conference on Systems, Man and Cybernetics, 2004, pp. 392-397.
International Search Report and Written Opinion for Application No. PCT/US2020/012976, dated May 6, 2020.
Kauffman et al., "Research Directions on the Role an Impact of ICT in Microfinance", Proceedings of the 43rd Hawaii International Conference on System Sciences, 2010, pp. 10.

\* cited by examiner

SYSTEMS AND METHODS FOR SECURE DATA AGGREGATION AND COMPUTATION

CROSS-REFERENCE TO RELATED APPLICATIONS

The present application claims priority benefit to U.S. provisional Application No. 62/791,554, filed Jan. 11, 2019 and titled SYSTEMS AND METHODS FOR SHARE-NOTHING DATA AGGREGATION AND COMPUTATION, which is incorporated by reference herein in its entirety for all purposes.

BACKGROUND

Field

The present development relates to secured multi-party computing systems and methods, and, specifically, to calculating various attributes and values among various entities without requiring the entities to share confidential data.

Description of Related Art

In the current age of technology and as smart devices are more closely integrated with daily lives of people across the globe, data is quickly becoming more valuable, and with the increased value, more protected by those that obtain and/or accrue the data. Entities that do obtain and/or have the data are often unwilling to share that data with other entities in view of many fears, including the risk and/or liability of a data breach, privacy concerns of those whose data the entities have, or risk of being replaced by those entities with which they share the data. However, many of these entities often are required to work together. For example, banks must often exchange users' information as required for daily transactions, which may not be desirable for the banks.

Accordingly, improved systems, devices, and methods for efficiently and effectively enabling secured multi-party computing to aggregate but without requiring sharing confidential data are desirable.

SUMMARY

Various implementations of methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect the present disclosure described herein includes a data aggregation and computation system. The system comprises an interface configured to receive an inquiry from a requesting entity for computing information regarding an individual based on pieces of information held by a plurality of entities. The system further comprises a controller configured to communicate an identifier for the individual to a processor system associated with each of the entities based on the inquiry. The system further comprises one or more clusters of computation nodes. Each cluster is configured to receive encrypted data fragments from one or more of the processor systems. The processor systems are each configured to generate one or more encrypted data fragments based on processing one or more of the pieces of information held by an entity associated with the respective processor system. The encrypted data fragments comprise unrecognizable fragments that no individual processor system can re-assemble to recover the one or more pieces of the information. Each cluster is also configured to perform secure, multi-party computations based on the data fragments received from each of the processor systems. Each cluster is further configured to generate a result based on the secure, multi-party computations for the individual and communicate the result to the controller. The controller is further configured to generate a response and provide the response to the interface for providing to the requesting entity.

In some aspects, the plurality of entities comprise one or more of a financial institution, a healthcare institution, or a consumer data institution.

In some aspects, the system further comprises an identifier database and the controller is further configured to identify respective identifiers of the individual for each of the plurality of entities based on the inquiry and communicate the respective identifiers to the processor system associated with each of the entities.

In some aspects, each of the one or more clusters of computation nodes is further configured to receive the data fragments for further processing in aggregate from the processor system associated with each of the entities, and wherein each processor system is further configured to perform initial computations on individual pieces of information before generating the data fragments.

In some aspects, the controller is further configured to identify the initial computations performed by the processor system associated with each of the entities and the secure, multi-party computations performed by the one or more clusters of computation nodes.

In some aspects, the controller is further configured to identify a quantity of computation nodes in the one or more clusters that perform the secure, multi-party computations, wherein the quantity is based on a desired security level.

In some aspects, the inquiry comprises an information verification request comprising verification information to be verified, and wherein the response is an affirmative or negative response.

In some aspects, the interface is further configured to provide the affirmative response to the requesting entity in response to the inquiry when the result verifies the verification information and provide the negative response in response to the inquiry when the result does not verify the verification information.

In some aspects, each cluster is further configured to compute an income value for the individual based on the data fragments received from each of the processor systems. The result verifies the verification information when a difference between the verification information and the income value is less than or equal to a threshold value. The result does not verify the verification information when the difference is greater than the threshold value.

In some aspects, the inquiry comprises a request to compute a credit score for the individual, and wherein the response comprises the credit score for the individual.

Another aspect of the present disclosure described herein includes a method of aggregating and processing data. The method comprises receiving an inquiry from a requesting entity for computing information regarding an individual based on pieces of information held by a plurality of entities and communicating an identifier for the individual to a processor system associated with each of the entities based on the inquiry. The method also comprises receiving encrypted data fragments from one or more of the processor systems, wherein the processor systems are each configured to generate one or more encrypted data fragments based on processing one or more of the pieces of information held by an entity associated with the respective processor system, and wherein the encrypted data fragments comprise unrecognizable fragments that no individual processor system can re-assemble to recover the one or more pieces of the information. The methods further comprises performing secure, multi-party computations based on the data fragments received from each of the processor systems, generating a result based on the secure multi-party computations for the individual, communicating the result to a controller, and generating a response and provide the response to the interface for providing to the requesting entity.

In some aspects, the plurality of entities comprise one or more of a financial institution, a healthcare institution, or a consumer data institution.

In some aspects, the method further comprises identifying respective identifiers of the individual for each of the plurality of entities based on the inquiry, and communicating the respective identifiers to the processor system associated with each of the entities.

In some aspects, the method further comprises receiving the data fragments for further processing in aggregate from the processor system associated with each of the entities, wherein each processor system is further configured to perform initial computations on individual pieces of information before generating the data fragments.

In some aspects, the method further comprises identifying the initial computations performed by the processor system associated with each of the entities and the secure, multi-party computations performed by the one or more clusters of computation nodes.

In some aspects, the method further comprises identifying a quantity of computation nodes in the one or more clusters that perform the secure, multi-party computations, wherein the quantity is based on a desired security level.

In some aspects, the inquiry comprises an information verification request comprising verification information to be verified, and wherein the response is an affirmative or negative response.

In some aspects, the method further comprises providing the affirmative response to the requesting entity in response to the inquiry when the result verifies the verification information and providing the negative response in response to the inquiry when the result does not verify the verification information.

In some aspects, the methods further comprising computing an income value for the individual based on the data fragments received from each of the processor systems, wherein the result verifies the verification information when a difference between the verification information and the income value is less than or equal to a threshold value and wherein the result does not verify the verification information when the difference is greater than the threshold value.

In some aspects, the inquiry comprises a request to compute a credit score for the individual, and wherein the response comprises the credit score for the individual.

An additional aspect of the present disclosure described herein includes a method of aggregating and processing data relative to an inquiry regarding an entity. The method comprises receiving identifying information for the entity, identifying one or more identifiers related to the entity based on at least the received identifying information, and communicating the one or more identifiers to a client-side processing unit associated with each of a plurality of partner institutions. The methods also comprises, for each client-side processing unit, querying one or more records from a record database based on the one or more identifiers, receiving the one or more records from the record database, processing the received one or more records to generate data fragments, and for each computation node of a computation group, computing combined attributes based on the generated data fragments and generating a response to the inquiry based on the computed combined attributes.

DETAILED DESCRIPTION

Figure 1:
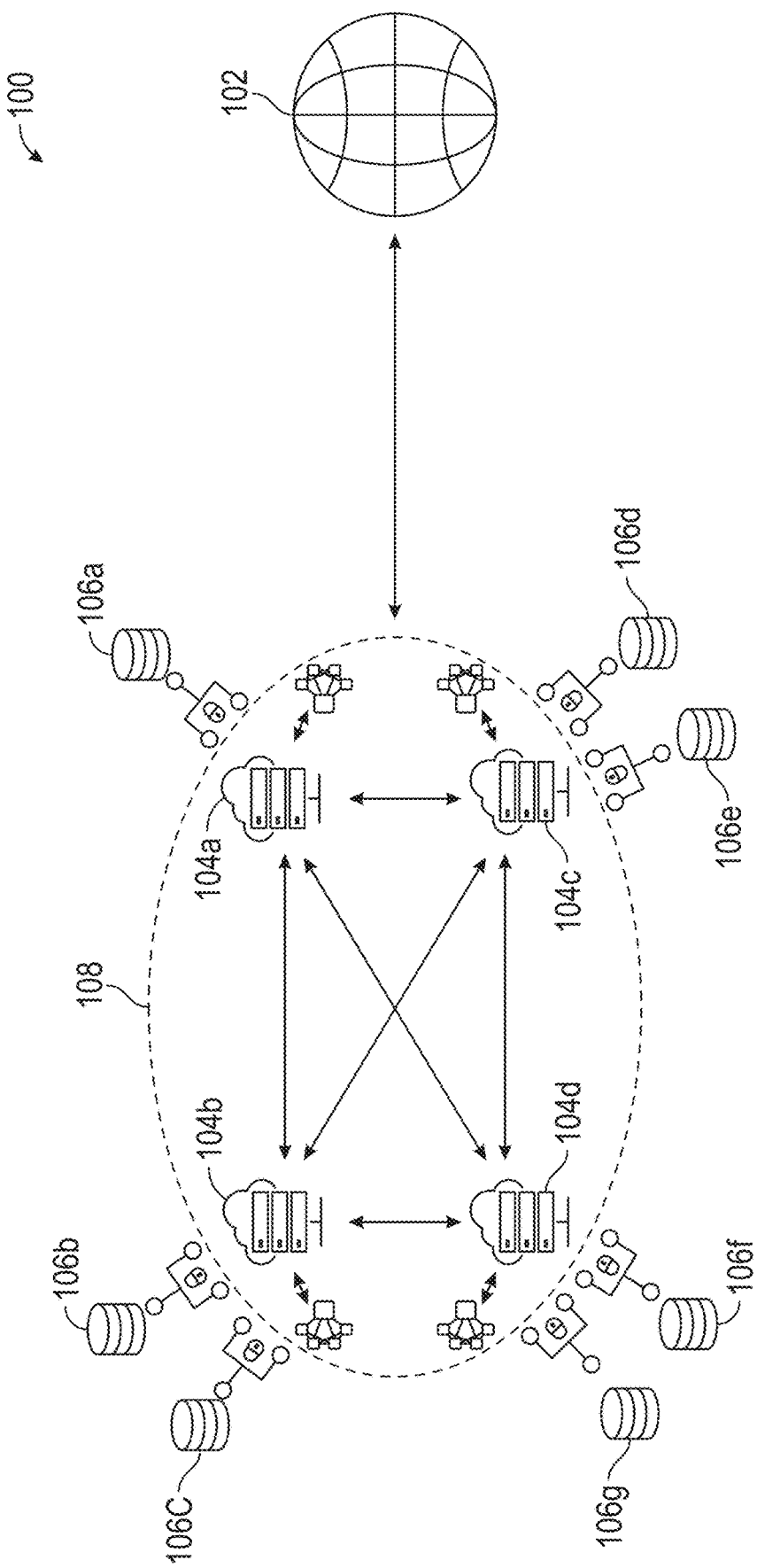
FIG. 1 shows a diagram of an example service platform implementing secure multi-party computations across a plurality of entities.

In the current data and online environment, many parties have increasing concerns regarding maintaining data privacy and data security. As such, traditional data aggregation models where a data aggregator obtains necessary data from multiple data providers and centralizes the data in one place for further processing are facing significant challenges. Furthermore, a party is often hesitant to share data with other parties for fear of the other parties gaining market share based on the party's data or for fear of the other parties exposing the party to privacy or data concerns. The systems and methods described herein provide a new universal computational framework that is decentralized, secure, privacy preserving, and scalable. The systems and methods achieve the data security and privacy preservation by retaining all data within data providers without having the data providers release respective data outside of respective local environments in any externally re-constructible way. The systems and methods achieve the scalability by decomposing computations as appropriate so computations are practical and by deferring the most computation and communication intensive portions to later stages of the computations as much as possible. For example, each data provider may perform local analysis and computations relevant to the data provided by the data provider and provide the results of the local analysis and computations. The results of the local analysis and computations may be shared as data fragments that alone are difficult or impossible to convert into useful and/or recognizable data. Further details of the processing are provided below.

An industrial problem may involve the aggregation and processing of a variety of data from a number of data sources to identify and distill deeper insights from the data. In its most general form, the industrial problem can be basically expressed in the recursive equation, Equation 1.0:

$$\text{outcome}(X) = (C\_or\_M(key_1, f_1, *), C\_or\_M(key_2, f_2, *), C\_or\_M(key_3, f_3, *), \ldots, C\_or\_M(key_k, f_k, *)) \quad \text{Equation 1.0}$$

Where:
outcome(X) represents the outcome of the calculation of the set of data X;
'*' can be either the set of data X, or, another C_or_M
C_or_M is an operation, which in some embodiments may be either a 'Combine' operation (C), which combines information over the data indexed by a given key (for example, $key_1$) or, a 'Map' operation (M), where each record in the data is indexed by the given key. The actual operation in Combine or Map is indicated by the function name identified in the second argument, $f_1$. The identified function in $f_1$ can be an operation that performs either 'Combine' or 'Map'.
  In the case of Combine, the function can be one or more operations such as calculating a total, a product, an average, a maximum value, a minimum value, a count, etc. of the data indexed by the given key.
  In the case of Map, the function can be one or more operations that either map the value in the record to another value through an operation defined in the function, or, it can be a filter function that determines whether the keep the value in the record or not, etc.

Any computation framework can be used to calculate the recursive Equation 1.0. For example, the data management community may use SQL to calculate Equation 1.0 while the "Big Data" community may use Map Reduce. However, such calculation of the Equation 1.0 using typical existing computation frameworks may assume or expect that the data, X, utilized to solve the recursive Equation 1.0 is accessible by any single entity performing the calculation or generally using the computation framework. In such instances, the single entity may operate as an aggregator of data from multiple sources and operate on the aggregated data in its raw form.

The systems and methods described herein leverage Secure Multi-Party Computation, "SMPC", to construct a decentralized computational environment that enables data owners and/or custodians (for example, financial institutions) to utilize their own privately and/or securely held client data to create aggregated or derivative data for those clients in conjunction with privately and/or securely held client data of others (for example, other financial institutions) without any party having to physically or digitally share their own private data with anyone else. The described systems and methods provide benefits of SMPC while alleviating the participating parties from the burden of the need to host and maintain the sophisticated equipment and mechanisms that provide the secure computation capabilities by decentralizing the computation environment in a secured cloud environment hosted by a third party. The resulting architecture is flexible in that participating parties can optionally host one or more parts of the computation environment (for example, the SMPC computation environment) should a use case benefit from such a configuration.

These systems and methods may implement an algorithm that establishes and utilizes a decentralized computational framework that overcomes issues in the above referenced centralized computational framework. The algorithm may begin with the recursive Equation 1.0. However, instead of processing the Equation 1.0 with the computational framework, as described above, the algorithm may decompose the Equation 1.0 into Equation 2.0 by expanding the data X into data held by individual data providers, such as may be represented in the below equation according to some embodiments:

$$\text{outcome}(X) = (C\_or\_M(key_1, f_1, *), C\_or\_M(key_2, f_2, *), \quad \text{Equation 2.0}$$
$$C\_or\_M(key_3, f_3, *), \ldots, C\_or\_M(key_k, f_k, *)) =$$
$$C\_or\_M(key_1, f_1, C\_or\_M(key_2, f_2, X_{B_1}),$$
$$C\_or\_M(key_3, f_3, X_{B_1}), \ldots, C\_or\_M(key_k, f_k, X_{B_1}),$$
$$C\_or\_M(key_2, f_2, X_{B_2}), C\_or\_M(key_3, f_3, X_{B_2}),$$
$$\ldots, C\_or\_M(key_k, f_k, X_{B_2}), \ldots \ldots,$$
$$C\_or\_M(key_2, f_2, X_{B_n}), C\_or\_M(key_3, f_3, X_{B_n}),$$
$$\ldots, C\_or\_M(key_k, f_k, X_{B_n}))$$

Where, $X = (X_{B_1}, \ldots, X_{B_n})$ and $X_{B_i}$ are data from party $B_i$

The algorithm then determines which of the operations in the Equation 2.0 are performed locally and which are performed by the computational framework. For example, portions of the C_or_M function will be performed locally (for example, at the individual data provider providing the data, such a portion identified as $C\_or\_M_{local}$) while other portions of the C_or_M function are performed by a decentralized system, for example an SMCP system (such a portion identified as $C\_or\_M_{secure}$). Starting from the last C_or_M function in the recursion and working from the bottom up, the algorithm may determine whether the key in the C_or_M function is contained in each data provider and, if so, the $C\_or\_M_{local}$ function will be executed locally. If the C_or_M function is a Map function, the $C\_or\_M_{local}$ function will be executed locally; if the C_or_M function is a Combine function, then the algorithm determines whether the C_or_M function is decomposable or not. If the C_or_M function is decomposable (for example, $f(X_{B_1}, \ldots, X_{B_n}) =_g (h(X_{B_1}), \ldots, h(X_{B_n})$, where the function is, for example, a sum, product, minimum, maximum, and so forth), then the algorithm limits a key range in C_or_M(key, . . . ) with a provider ID as $C\_or\_M_{local}$(provider_id, key, . . . ) so that h(*) is executed locally with the provider and g(*), which corresponds to a $C\_or\_M_{secure}$ operation, is executed securely to combine the results. However, if the C_or_M function is not decomposable, but the computation can be approximated (for example, median of median can be an approximation of the true median), then the C_or_M function is replaced with an approximation function that can execute $C\_or\_M_{local}$ locally if desired.

For the remainder of the C_or_M function (for example, the $C\_or\_M_{secure}$), the corresponding operations and/or computations may be performed in a decentralized manner, for example via the SMCP system. Thus, the $C\_or\_M_{secure}$ computations are performed by one or more computations nodes of the SMCP system. Such computations of Equation 2.0 may be scaled. For example, scaling these computations may comprise the algorithm determining the desired security level (for example, no more than k computation nodes can be compromised at the same time). Once the security level is determined, the algorithm may determine an appropriate number of SMPC computation nodes per algorithm, such as n=(k*2+1). For example, the number of computation nodes k used may be a function of the number of nodes of concern that a bad party may compromise or to which the bad party gains access. Thus, so for the SMPC system to maintain security when 5 nodes are compromised, the SMPC system may use k=11 nodes so that such the bad party will not have access to a majority of the SMPC computation nodes.

For each of the data providers, a local agent associated with the data provider (for example, part of a processing system of the data provider) fragments the data elements to be shared with the SMPC (for example, computed using the $C\_or\_M_{secure}$). This process may utilize a "secure data adaptor layer". In some embodiments, the local agent fragments the data elements to be shared into n data fragments that, if assembled appropriately, form the data elements to be shared. Each of the n data fragments is distributed to each of the n SMPC computation nodes that perform the remaining $C\_or\_M_{secure}$ operations or functions in a secure manner (for example, as described with respect to the SMPC system described herein). Illustrations of this algorithm being applied are provided below.

1. Exemplary Term Descriptions

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary definitions.

Data Store: Includes any computer readable storage medium and/or device (or collection of data storage mediums and/or devices). Examples of data stores include, but are not limited to, optical disks (for example, CD-ROM, DVD-ROM, and so forth), magnetic disks (for example, hard disks, floppy disks, and so forth), memory circuits (for example, solid state drives, random-access memory ("RAM"), and so forth), and/or the like. Another example of a data store is a hosted storage environment that includes a collection of physical data storage devices that may be remotely accessible and may be rapidly provisioned as needed (commonly referred to as "cloud" storage).

Database: Includes any data structure (and/or combinations of multiple data structures) for storing and/or organizing data, including, but not limited to, relational databases (for example, Oracle databases, MySQL databases, and so forth), non-relational databases (for example, NoSQL databases, and so forth), in-memory databases, spreadsheets, as comma separated values ("CSV") files, eXtendible markup language ("XML") files, TeXT ("TXT") files, flat files, spreadsheet files, and/or any other widely used or proprietary format for data storage. Databases are typically stored in one or more data stores. Accordingly, each database referred to herein (for example, in the description herein and/or the figures of the present application) is to be understood as being stored in one or more data stores.

Database Record and/or Record: Includes one or more related data items stored in a database. The one or more related data items making up a record may be related in the database by a common key value and/or common index value, for example.

Event Notification, Notification, and/or Alert: Includes electronic any notification sent from one computer system to one or more other computing systems. For example, a notification may indicate a new record set or changes to one or more records of interest. Notifications may include information regarding the record change of interest, and may indicate, for example, to a user, an updated view of the data records. Notifications may be transmitted electronically, and may cause activation of one or more processes, as described herein.

Transaction data (also referred to as event data) may generally refer, in some embodiments, to data associated with any event, such as an interaction by a user device with a server, website, database, and/or other online data owned by or under control of a requesting entity, such as a server controlled by a third party, such as a merchant. Transaction data may include merchant name, merchant location, merchant category, transaction dollar amount, transaction date, transaction channel (e.g., physical point of sale, Internet, etc.) and/or an indicator as to whether or not the physical payment card (e.g., credit card or debit card) was present for a transaction. Transaction data structures may include, for example, specific transactions on one or more credit cards of a user, such as the detailed transaction data that is available on credit card statements. Transaction data may also include transaction-level debit information, such as regarding debit card or checking account transactions. The transaction data may be obtained from various sources, such as from credit issuers (e.g., financial institutions that issue credit cards), transaction processors (e.g., entities that process credit card swipes at points-of-sale), transaction aggregators, merchant retailers, and/or any other source. Transaction data may also include non-financial exchanges, such as login activity, Internet search history, Internet browsing history, posts to a social media platform, or other interactions between communication devices. In some implementations, the users may be machines interacting with each other (e.g., machine-to-machine communications). Transaction data may be presented in raw form. Raw transaction data generally refers to transaction data as received by the transaction processing system from a third party transaction data provider. Transaction data may be compressed. Compressed transaction data may refer to transaction data that may be stored and/or transmitted using fewer resources than when in raw form. Compressed transaction data need not be "uncompressible." Compressed transaction data preferably retains certain identifying characteristics of the user associated with the transaction data such as behavior patterns (e.g., spend patterns), data cluster affinity, or the like.

User: depending on the context, may refer to a person, such as an individual, consumer, or customer, and/or may refer to an entity that provides input to the system and/or an entity that utilizes a device to receive the event notification, notification or alert (for example, a user who is interested in receiving notifications upon the occurrence of the newly generated record set or changes to records of interest). Thus, in the first context, the terms "user," "individual," "consumer," and "customer" should be interpreted to include single persons, as well as groups of users, such as, for example, married couples or domestic partners, organizations, groups, and business entities. Additionally, the terms may be used interchangeably. In some embodiments, the terms refer to a computing device of a user rather than, or in addition to, an actual human operator of the computing device.

An entity may generally refer to one party involved in a transaction. In some implementations, an entity may be a merchant or other provider of goods or services to one or more users, a financial institution, a bank, a credit card company, an individual, a lender, or a company or organization of some other type.

A model may generally refer to a machine learning construct which may be used by the transaction processing system to automatically generate a result or outcome. A model may be trained. Training a model generally refers to an automated machine learning process to generate the model that accepts an input and provides a result or outcome as an output. A model may be represented as a data structure that identifies, for a given value, one or more correlated values. For example, a data structure may include data indicating one or more categories. In such implementations, the model may be indexed to provide efficient look up and retrieval of category values. In other embodiments, a model may be developed based on statistical or mathematical properties and/or definitions implemented in executable code without necessarily employing machine learning.

A vector encompasses a data structure that can be expressed as an array of values where each value has an assigned position that is associated with another predetermined value. For example, an entity vector will be discussed below. A single entity vector may be used represent the number of transaction for a number of users within a given merchant. Each entry in the entity vector represents the count while the position within the entity vector may be used to identify the user with whom the count is associated. In some implementations, a vector may be a useful way to hide the identity of a user but still provide meaningful analysis of their transaction data. In the case of entity vectors, as long as the system maintains a consistent position for information related to a user within the vectors including user data, analysis without identifying a user can be performed using positional information within the vectors. Other vectors may be implemented wherein the entries are associated with transaction categories or other classes of transaction data.

Machine learning generally refers to automated processes by which received data is analyzed to generate and/or update one or more models. Machine learning may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as transactions or transaction categories as will be described in further detail below.

Requesting Entity generally refers to an entity, such as a business, a non-profit organization, an educational institution, an automobile dealer, a vehicle manufacture, a financial institution, etc., that request information and/or services from one or more of the systems discussed herein. For example, a requesting entity may comprise an automobile dealership that provides customer information for monitoring of events that may be indicative of opportunities to enhance relationships with particular customers, and the requesting entity may receive notifications of when such events occur so that appropriate action can be timely taken.

A recommendation or result encompasses information identified that may be of interest to a user having a particular set of features. For example, a recommendation or result may be developed for a user based on a collection of transaction or similar data associated with the user and through application of a machine learning process comparing that transaction data with third-party transaction data (e.g., transaction data of a plurality of other users). A recommendation may be based on a determined entity and may include other merchants or vendors related to or similar to the determined merchant. In some implementations, the recommendation may include recommendation content. The recommendation content may be text, pictures, multimedia, sound, or some combination thereof. In some implementations, the recommendation may include a recommendation strength. The strength may indicate a confidence level in the recommendation by the computing system. As such, the strength may be included to allow systems receiving the recommendation to decide how much credence to give the recommendation.

A message encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, a message may be composed, transmitted, stored, received, etc. in multiple parts.

The terms determine or determining encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The term selectively or selective may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

The terms provide or providing encompass a wide variety of actions. For example, "providing" may include storing a value in a location for subsequent retrieval, transmitting a value directly to a recipient, transmitting or storing a reference to a value, and the like. "Providing" may also include encoding, decoding, encrypting, decrypting, validating, verifying, and the like.

A user interface (also referred to as an interactive user interface, a graphical user interface or a UI) may refer to a web-based interface including data fields for receiving input signals or providing electronic information and/or for providing information to the user in response to any received input signals. A UI may be implemented in whole or in part using technologies such as HTML, Flash, Java, .net, web services, and RSS. In some implementations, a UI may be included in a stand-alone client (for example, thick client, fat client) configured to communicate (e.g., send or receive data) in accordance with one or more of the aspects described.

2. Example Service Platform

As described above, decentralized computation frameworks may enable secure computation of information from multiple parties without requiring one or more of the parties to share data with any other parties that have data relevant to the computation. Such a decentralized computation framework may be implemented by a service platform as shown in FIG. 1. FIG. 1 shows a diagram of an example service platform 100 implementing secure multi-party computations across a plurality of entities (for example, the data providers as introduced above). As shown, the service platform 100 includes a requesting device 102 (for example, connected to the service platform 100 via the Internet or similar connection), which may be operated by, owned by or otherwise associated with any entity that is requesting one or more pieces of information or results based on data held by one or more other entities (for example, the institutions 106a-106g). As described herein, the requesting device 102 may correspond to a requesting individual, a requesting entity, a requesting institution, and so forth, where the requesting device 102 is used by the requesting individual, requesting entity, requesting institution, and so forth, to access the service platform 100. In some embodiments, the institutions 106a-106g comprise banks, financial institutions, and so forth. In some embodiments, the institutions 106a-106g have information useful for performing a service requested by or from the requesting device 102. The service platform 100 also includes computation nodes 104a-104d, which perform various computations based on information provided by the institutions 106a-106g (each with their own computing systems or servers). The service platform 100 includes the institutions 106a-106g, which each may be custodians or holders of private data regarding their clients, etc., and each of which may not wish to share their private data with any other entity. The service platform 100 also includes a network 108, which generally connects each of the requesting device, the computation nodes, and the institutions. In some embodiments, the computation nodes 104a-104d coupled via the network 108 comprise an SMPC platform 110.

The requesting device 102 may receive a request, for example, of verifying an income for a client A. Verifying the client A's income may involve obtaining information from each of the institutions 106a, 106b, 106f, and 106g. However, each of these institutions 106a, 106b, 106f, and 106g may refuse or otherwise be hesitant to sharing its information regarding the client A with other institutions or with the requesting device 102.

Although each of the computation nodes 104a-104d may be shown in proximity to one or more particular institutions 106, the computation nodes 104a-104d may not be limited to working with only those particular institutions and may be able to work with any institutions 106a-106g connected to the network 108. In some embodiments, as shown in FIG. 1, one or more of the computation nodes 104 is in communication with its own (for example, local) network system and each of the computation nodes 104 are in communication with all of the other computation nodes 104. Accordingly, the computation nodes 104a-104d can exchange information and perform shared computing of data (for example, results from computations) without necessarily sharing the input data used in the computations. More details regarding the computation nodes 104a-104d and the network 108 are provided below.

The institutions 106a-106g may each comprise a local computing network (not shown in FIG. 1). The institutions 106a-106g may use their respective local computing networks to perform computations and/or other services on their own data that does not require or utilize data from another institution 106. By performing local processing at the institutions 106a-106g, the computations nodes 104a-104d may be reserved for processing of information from multiple of the institutions 106, thereby improving efficiencies of the service platform 100. The institutions 106a-106g are each connected to the SMPC platform comprising the computation nodes 104a-104d via a secure connection, as shown in FIG. 1 between each database of the institutions 106a-106g and the network 108. In some embodiments, the institutions 106a-106g are configured to provide one or more pieces of information or outcomes of processing the one or more of the pieces of information as encrypted data fragments to the computation nodes 104a-104d such that the encrypted data fragments comprises unrecognizable fragments that no computation node 104 can re-assemble to recover the one or more pieces of the information or the outcomes of processing the one or more pieces of information.

Two example use cases are provided below to illustrate operation of the algorithm described above with reference to Equation 2.0. The first example is a decentralized income verification/estimation solution. The second example is a decentralized credit scoring solution. Additional details for each solution are provided below.

Example Income Verification/Estimation Use Case

In income verification/estimation operations, the income verification/estimation may utilize review and verification of physical or electronic statements regarding each corresponding financial record (for example, bank records). However, such efforts may be time consuming and difficult to complete with respect to verification processes given privacy and data security concerns. Operations where financial institutions share data related to income verification freely with a centralized aggregator (for example, another financial institution or an unrelated third party) may also be negatively viewed given the data security and privacy concerns. Instead, as noted above, decentralized operations using the framework and/or service platform 100 of FIG. 1 may instead be used to implement secure processing of the income verification/estimation data from the multiple financial institutions.

For example, following the algorithm described with relation to Equations 1.0 and 2.0 above, the algorithm formulates a centralized version of an income verification/estimation operation as in Equation 3.0 below. According to Equation 3.0, each transaction in the consumer's banking accounts is processed and mapped to different categories such as regular income, expense, transfer, interest, and so forth. Irrelevant transactions may be filtered out and not used in further calculations to reduce computation overhead. For example, the Combine function $a_1$ identifies a transfer of funds operation by finding pairs of transactions of the same amount but opposite signs in different accounts. Then, a Combine function $a_2$ tallies up a total amount from all of the relevant transactions to derive the consumer's income.

$$\text{consumer income} = \text{Combine}(\text{'consumer'}, a_2, \text{Combine} \\ (\text{'consumer,date,} txn_{type}\text{'}, a_1, \text{Map}(\text{'txn'}, l_3, \text{Map} \\ (\text{'txn'}, l_2, \text{Map}(\text{'txn'}, l_1, X)))) \quad \text{Equation 3.0}$$

As described above, the algorithm decomposes the centralized solution to generate a decentralized solution by allowing for the data to be from each of the data providers, as noted in Equation 4.0 below.

$$\text{consumer income} = \text{Combine}(\text{'consumer'}, a_2, \text{Combine} \\ \begin{cases} \text{'consumer, date, txn\_type'}, a_1, \\ \text{Map}(\text{'txn'}, l_3, \text{Map}(\text{'txn'}, l_2, \text{Map}(\text{'txn'}, l_1, X_{B_1})), \\ \text{Map}(\text{'txn'}, l_3, \text{Map}(\text{'txn'}, l_2, \text{Map}(\text{'txn'}, l_1, X_{B_2})), \\ \ldots \ldots, \\ \text{Map}(\text{'txn'}, l_3, \text{Map}(\text{'txn'}, l_2, \text{Map}(\text{'txn'}, l_1, X_{B_k})) \end{cases} \quad \text{Equation 4.0}$$

Figure 2:
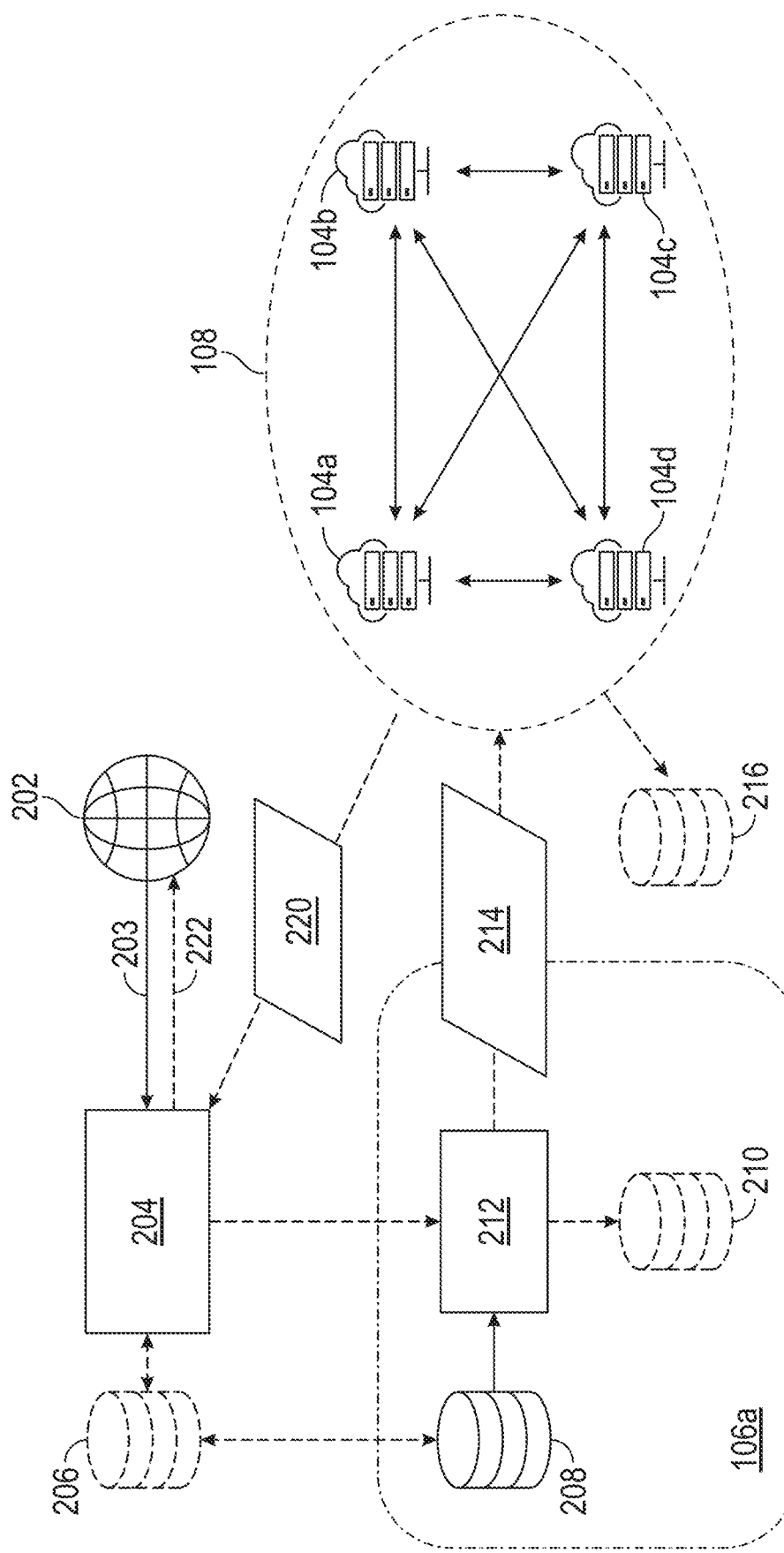
FIG. 2 shows a dataflow diagram of an example verification of income request as processed by the service platform shown in FIG. 1.

The algorithm then identifies the $C\_or\_M_{local}$ and $C\_or\_M_{secure}$ operations for the Equation 4.0. For example, the algorithm identifies the Map functions in Equation 4.0 to be executable locally in the data providers. Furthermore, the Combine operation or function Combine('date,txn_type', $a_1, \ldots$) of Equation 4.0 that cancels out the transfer pairs may be decomposable and may be executed locally first within each data provider. A second Combine function $a_{1'}$ may be added as a parent function that will be executed in the SMPC environment, for example to sum all transactions, etc., to verify/estimate the total income for the consumer. Thus, the second, or parent Combine function $a_{1'}$ may be the $C\_or\_M_{secure}$ operation. Thus, any parent Combine functions will be executed in the SMPC environment. A resultant equation is shown in Equation 5.0 below.

identifier in records for the ID DB 206. The ID DB 206 may provide each of these identifiers to the income verification service 204. The income verification service 204 may communicate with each of the institutions 106a-106g and provide them with the identifiers received from the ID DB 206 and the requesting institution 102. FIG. 2 shows only one institution 106a, for example a bank environment.

The institution 106a receives the identifiers and accesses the relevant information and/or records (hereinafter information) from a local database (for example, the DDA transactions 208) of the institution 106a. In some embodiments, the institution 106a performs any relevant and local processing on the relevant information from the DDA transactions 208 before providing the corresponding information to the computations nodes 104a-104d of the SMPC platform $$\text{consumer income} = Combine_{secure}('consumer', a_2, Combine_{secure}('consumer, date, txn\_type', a'_1, \begin{Bmatrix} 'date, txn\_type', a_1, \\ Combine_{local}('B_1, consumer, date, txn\_type', a_1, Map_{local}('txn', l_3, Map_{local}('txn', l_2, Map_{local}('txn', l_1, X_{B_1}), \\ Combine_{local}('B_2, consumer, date, txn\_type', a_1, Map_{local}('txn', l_3, Map_{local}('txn', l_2, Map_{local}('txn', l_1, X_{B_2}), \\ \ldots \ldots , \\ Combine_{local}('B_n, consumer, date, txn\_type', a_1, Map_{local}('txn', l_3, Map_{local}('txn', l_2, Map_{local}('txn', l_1, X_{B_n}) \end{Bmatrix} \quad \text{Equation 5.0}$$

This example is described in more detail with respect to FIG. 2.

FIG. 2 shows a dataflow diagram 200 of an example verification of income request as processed by the service platform 100 shown in FIG. 1. The dataflow 200 shown in FIG. 2 begins with a requesting institution 202, which may request a service that involves analyzing "private" information from various sources (for example, information that the sources do not want to share with each other). In some embodiments, the requested service comprises one or more of an income, employment, and assets verification, fraud prevention, cashflow, and revenue, among others. As noted above, the requesting institution 202 may correspond to or use the requesting device 102 to access the service platform 100. Additionally, such service platforms may be used in various industries, including healthcare or medical record aggregation and analysis, advertising, utilities, insurance, financial services, data analysis, credit monitoring, credit data bureaus or alternative data bureaus, location-based risk assessment, insurance fraud, attributing purchases to advertisements, and many others.

As shown in FIG. 2, the requesting institution 202 transmits an income verification request or inquiry 203 to an income verification service 204. The request 203 may include an identifier if an individual or entity (for example, when the request is for an income verification or a credit score or the like). The income verification service 204 communicates the received identifier with an identifier database (ID DB) 206 and with one or more banks 208. The ID DB 206 may determine whether there are aliases or other identifiers associated with the identifier received in the request 203. For example, if the request 203 includes the identifier "Bob Dixon" along with some personal information for Bob Dixon (for example, a social security number (SSN) or address or date of birth (DOB), and so forth). The ID DB 206 may use the identifier Bob Dixon to identify additional aliases or identifiers that correspond to the Bob Dixon identifier. For example, the ID DB 206 returns identifiers Robert Dixon and Rob Dixon that share one or more of the SSN, address, or DOB with the Bob Dixon via the network 108. The local processing may be completed by a processor 212. In some embodiments, the institution 106a stores details of the request, the local processing, and the provided information in a local audit log 210. The institution 106a may provide the corresponding information as fragmented attributes 212 to the SMPC platform. The fragmented attributes may merely comprise the bare data needed in conjunction with data from other institutions 106 without any identifying information or details of the fragments.

In some embodiments, the institution 106a calculates particulars of the income verification based on only its own records (for example, the information from the DDA transactions 210) and then fragments the calculated particulars for communication to the SMPC platform. Due to the fragmentation, as will be described in further detail herein, none of the private information of the institution 106a or the results of the local computations performed by the institution 106a is likely to be determined based on receiving some of the fragments, and privacy between the institutions 106 is maintained. The SMPC platform then uses the fragmented local information from multiple banks to determine, based on the private information received from a plurality of banks, results to the income verification inquiry and reports the results back to the income verification service as inquiry results 220, which provides the results to the requesting institution 202 as a response 222. Details of this process are provided below.

For example, the dataflow 200 of the service platform 100 may be applied to verifying/estimating Bob Dixon's income using, for example, Bob Dixon's account history. In some embodiments, the account history may include records from a number of financial institutions. The records may include transaction descriptions for transactions that involve or occur at the respective financial institution. At a high level, performing the income verification/estimation by the service platform 100 may involve analyzing each transaction for each financial institution. Given a number of transactions that an average consumer has in their financial transactions, having the computation nodes 104a-104d of the SMPC platform analyze each of these transactions would be resource and time intensive. Thus, some processing of these transactions may be offloaded to each financial institution such that each financial institution performs some "preprocessing" of its financial transactions and records.

Different approaches may be used for verifying/estimating income for a consumer. One example approach may assume that transaction information received in real-time includes a transaction amount and a transaction date and a limited number of pay-stream periods exist (for example, weekly, biweekly, monthly, quarterly, annually, and so forth). As such, each identified transaction is "fit" into one of the existing pay-streams. Another example approach may assume that transactions include descriptions that may group such transactions by the descriptions into different streams. Then, date differences between the transactions in each stream are analyzed to determine periodic streams.

In some embodiments, much of the processing for income verification/estimation may be performed locally in each institution 106. For example, deposits from pay checks and payments of bills may be easily identified and used to determine an income of Bob Dixon by a single institution 106. For example, the processor 212 of the institution 106a may locally calculate an income of a particular customer based on its local transactions without involving another institution 106. However, some transactions (such as transfers between accounts or institutions 106) may require review of records and/or data from the institutions 106. For example, the income verification/estimation system should not interpret a transaction regarding transfer of funds between accounts of Bob Dixon as income for Bob Dixon. In order to reduce resource demand and to improve efficiencies and maintain data privacy and security, the processor 212 of each institution 106 may perform a bulk of the transaction/record processing in the income verification/estimation. Using the SMPC platform to cancel transactions that indicate transfers between accounts while maintaining data security and privacy may have a higher computational cost as compared to when data security and privacy concerns are paramount. However, using the SMPC platform may maintain higher accuracy.

In some embodiments, the processor 212 of the institution 106a may perform pre-processing of the transactions and records local to the institution 106a (for example, the transactions and records stored in the DDA transactions 208). The pre-processing may comprise any processing that is performed locally (for example, the C_or_M$_{local}$ operations or transactions described above). In some embodiments, the pre-processing by the processor 212 comprises discarding or ignoring transactions involving amounts of less than a threshold value, for example $100. Such an exclusion of transactions involving amounts that do not meet the threshold value may further reduce calculation overhead by effectively ignoring most of daily activities, which involve small-amount transactions. Although such pre-processing may result in losing some relevant transactions or records (for example, because some transactions or records involving amounts less than the threshold value can be qualified as income), the pre-processing by the processor 212 likely will not greatly impact a total income for Bob Dixon. In some embodiments, such exclusion of transactions especially saves calculation overhead when SMPC transaction cancelling is involved.

The processor 212 may further pre-process the transactions and records local to the institution 106a by discarding or ignoring incoming transactions (for example, deposits) from invalid or improper account types. For example, an invalid or improper account type may comprise any account type that is not a savings, checking account, an investment account, and the like. For example, if an "incoming" transaction occurs in a credit card type account, the transaction may be assumed to be a payment transaction and not an income transaction. Therefore, such transactions from the invalid or improper account types can be ignored for the purposes of verifying/estimating income. The pre-processing may further cancel intra-institution transfers. For example, when the institution 106a includes records for a savings account and a checking account for Bob Dixon, transfers of funds between the savings and checking accounts may be ignored as not involving income, but rather funds transfers. Similarly, if the institution 106a includes a credit card account and a checking/savings account, credits from the credit card account to the checking/savings account or payments from the checking/savings account to the credit card account may be ignored as not being income.

As part of the pre-processing, the processor 212 may apply a positive model or a negative model to predict whether a transaction in the DDA transactions 208 of the institution 106a is part of an inter-institution transfer pair. For example, the positive model comprises a model that takes the input of a transaction whose amount is "positive" (meaning that the transaction is an incoming transaction). The processor 212 then tries to predict whether the incoming transaction belongs to an inter-bank transfer pair or not. The processor 212 may analyze various description fields associated with the incoming transaction that are available, for example a transaction description field, a transaction amount field, a transaction time field, and a transaction account field. In some embodiments, one or more machine learning algorithms can be applied to efficiently and accurately perform such prediction, which may include implementation that relies on a bag-of-words model. The negative model is similar to the positive model, in that the negative model also aims to predict if a transaction belongs to an inter-bank transfer pair or not, but it uses "negative" transactions instead of "positive" transactions. The negative model can also be used to improve accuracy of the transfer identification pre-processing. However, while the positive model tries to predict whether a transaction is part of a transfer pair in general, the negative model aims to predict that whether a transaction is part of a transfer pair that is not predicted by positive model. In other words, for the transactions already "caught" or identified as part of a transfer pair by the positive model, the negative model need not catch or identify that transaction. This also implies that the negative model performance may depend on a cutoff of the positive model.

Once the processor 212 completes the pre-processing for verifying/estimating Bob Dixon's income, the processor 212 may generate the fragmented attributes 214 for distribution to the computation nodes 104a-104d for processing by the service platform. In some embodiments, the fragmented attributes 214 may comprise the transactions that may be part of a transfer pair and/or a verified/estimated income as determined by that institution 106a.

The service platform 100 may perform the processing of the C_or_M$_{secure}$ functions or operations. For example, the computation nodes 104a-104d may perform privacy-preserving comparisons to identify any transfers between institutions that would not be interpreted as income. Such privacy-preserving comparison in the SMPC platform may be very expensive (for example, time intensive, computation intensive, and so forth). The computation nodes 104a-104d of the SMPC platform may perform calculations in near real-time that sacrifice some aspects of data privacy and security to improve resource costs.

For example, the computation nodes 104a-104d may use the following parameters to perform the privacy-preserving comparison:

A number of transactions, for example, that the processor 212 (for example, the agent of the institution 106a) submitted to the computation nodes 104a-104d as data fragments after the pre-processing described above per day from each institution 106.

Whether each transaction is positive or negative.

A residue of a transaction amount divided by some small prime number (for example 2)

The computation nodes 104a-104d may calculate whether a pair of positive and negative transactions cancels out (for example, sum to 0). Data privacy and security can be maintained by calculating the sum of the positive and negative transactions of the potential transfer pair without revealing the sum. For example, the computation nodes 104a-104d may multiple the sum by some positive random number. A sign of the result of the sum multiplied by the positive random number may be the same as the sum. If the revealed result of the multiplication is zero, then the computation nodes 104a-104d can determine that the pair of transactions is likely a transfer pair and indicate as such (and exclude the pair of transactions from the income verification/estimation). This maintains data privacy and security because the sum of the transactions is unknown since the random number used is unknown. In some embodiments, the range of the random number may have a threshold minimum number.

In some embodiments, the processor 212 may perform one or more additional operations to further improve processing overhead of the computation nodes 104a-104d of the service platform 100. For example, the processor 212 may separate the data provided to the computation nodes 104a-104d. For example, for the potential transfer pairs, the processor 212 may separate positive transactions from negative transactions. Alternatively, or additionally, the processor 212 may separate transactions based on the corresponding residue. These improvements, however, come at the sacrifice of some aspect of data privacy. But they can sometimes still be implemented when the minor sacrifice (for example, revealing the amount of income is odd or even) does not pose a threat to leaking more sensitive information, while bringing a huge reduction on the computation overhead.

Figure 3:
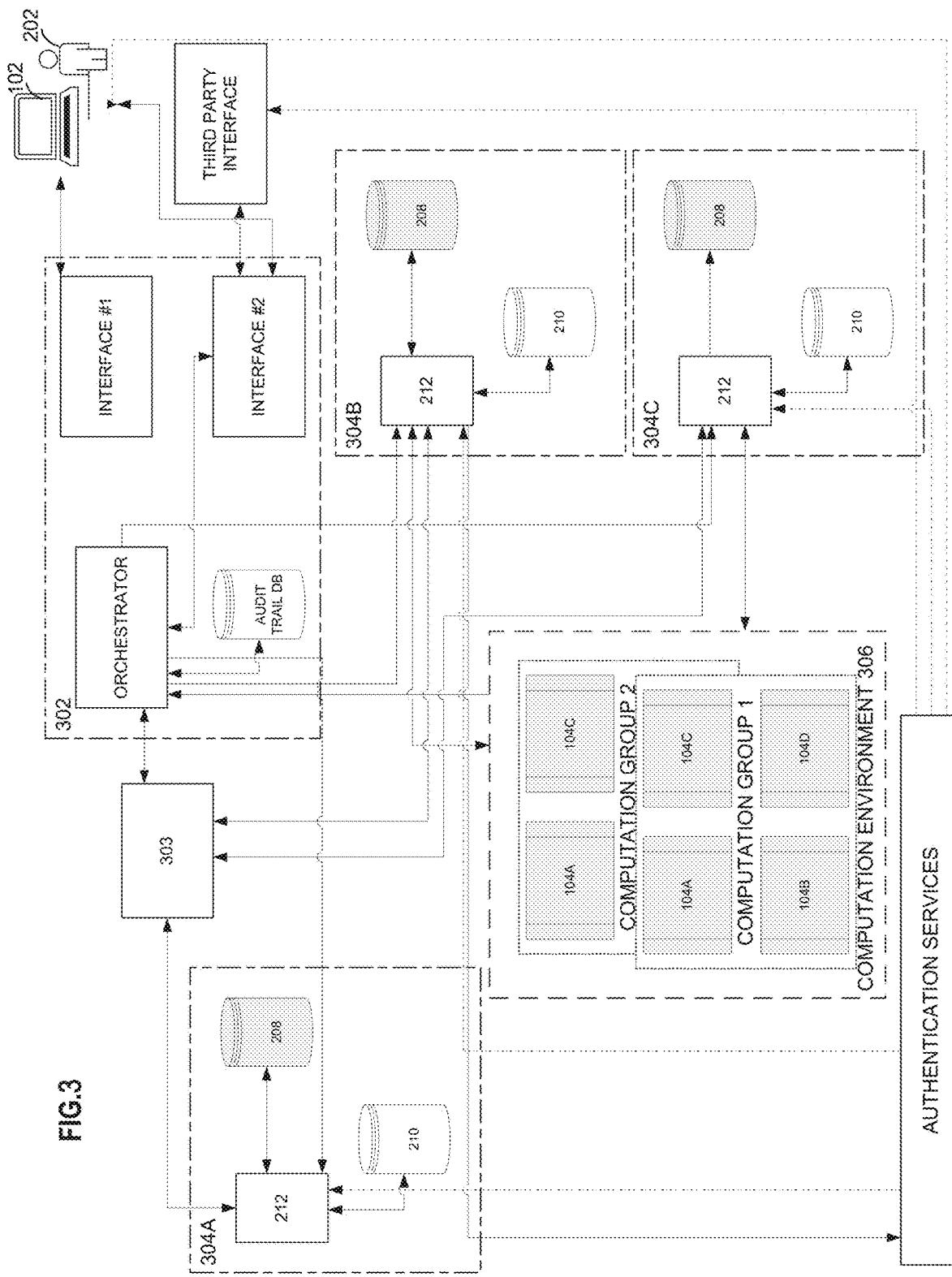
FIG. 3 shows an exemplary architecture and dataflow for the example service platform of FIG. 1 as it processes the verification of income request of FIG. 2.

FIG. 3 shows an exemplary architecture for the example service platform of FIG. 1 as it processes the verification of income request of FIG. 2. The exemplary architecture includes three major components: the service 302, the partners 304A-304C, and the computation environment 306. FIG. 3 shows data and/or other communications that flow between the various major components. The service 302 may correspond to the example income verification service 204 of FIG. 2. The partners 304 may correspond to the institutions 106. The computation environment 306 may correspond to the computation nodes 104 and the network 108 of FIGS. 1 and 2.

2.1. Service

The service 302 serves as an entry point of the architecture and the service platform of FIG. 1. For example, the service 302 receives a service request from a requesting entity via a web interface or application. Accordingly, the service 302 acts as a central controller that receives an inquiry (for example, in the form of personally identifiable information, "PII") from an inquiring entity (for example, a particular client, institutional client, or the requesting institution 202). The inquiry may be received via a human-to-machine interface (for example, a server-side application or similar interface) or machine-to-machine interfaces (for example, from a particular financial institution, such as via an Application Programming Interface, "API"). The service 302 may resolve the identity belonging to the PII based on various processing and/or verification steps, for example via an identity resolution service 303. In some embodiments, the identity resolution service 303 may comprise the ID DB 206 or a similar service. For example, the identify resolution service 303 may identify all identifiers that correspond with the PII received with the inquiry, where a different identifier may be assigned to the individual for different partners, in some embodiments. The resolved identity may comprise a hashed identifier, "ID", that is then provided to each partner 304, initiating the service (for example, income identification and calculation) at the partners 304A-304C. Lastly, the service 302 collects final results from the computation environment 306 and returns the results back to the inquirer.

The service 302 may include four components, in some embodiments:

1) A server-side program or application (which may be referred to as a webapp or web app or interface #1) for interaction with a browser, client-side application or similar interface;
2) An orchestrator;
3) An audit trail database; and
4) A proxy/API for requests (or interface #2).

The server-side application may authentic a user (for example, the inquiring entity) according to one or more authentication methods before allowing the inquiring entity to make a request of the service platform. In some embodiments, the user authentication is managed by a single sign on "SSO" or similar service.

The orchestrator works with each partner 304 as well as the decentralized computing environment 306 to fulfill any request or inquiry made of the service platform by the inquiring entity. The orchestrator may also receive results of computations by the computing environment and relays those results to the inquiring entity via one or more of the proxy, the server-side application, and/or similar interfaces.

The audit trail database records all interactions with the service 302, including failed sign on attempts and/or completed inquiries, along with identities of the inquiring entity. In some embodiments, one or more blockchain services may be used for auditing and logging.

The proxy/API allows third-party applications or interfaces to integrate with the service 302 to provide inquiries and/or receive results from inquiries. For example, the proxy/API allows for integration with systems from entities in the mortgage and/or other loan underwriting industries.

In some embodiments, the service 302 may correspond to a service provided by an entity (for example, an income verification service, a credit scoring service, and so forth). As such, the service 302 may be provided by a number of components, for example the components shown in the service 302 in FIG. 3. Alternatively, or additionally, the service 302 may correspond to a server system associated with an operator of the service 302. For example, the service 302 may be provided by an organization and correspond to the server system of the organization, where the components shown in the service 302 correspond to different modules or components in the server system of the organization.

The service 302 may be a "dynamic" service or a "static" service. As the dynamic service, the service 302 may receive different inquiries from and provide different responses to a requesting entity 202. For example, the dynamic service 302 may receive and process one or more of the income verification request and the credit score request, among others, as described herein. As such, the dynamic service 302 may dynamically change the processing performed by the computation environment 306. For example, the dynamic service 302 provides different secure operations to the computation environment 306 for processing by the corresponding computation nodes 104. The dynamic service 302 may instruct which secure mapping or computation operations the computation environment 306 (and therefore, the computations nodes 104) are to perform as part of the SMPC platform as compared to which operations will be performed by the partners 304 locally.

In some embodiments, the dynamic system 302 updates the operations to be performed by the computation environment 306 dynamically, for example via a push update or similar notification. In some embodiments, the dynamic system 302 provides the appropriate operation(s) to the computation environment 306 via the update, where the dynamic system 302 determines and provides the appropriate operation(s) based on the inquiry received from the requesting device 102. For example, the dynamic system 302 may comprise a library of operations associated with different inquiries and provide the appropriate operation(s) to the computation environment 306 based on the inquiry. In some embodiments, the dynamic system 302 provides an indicator identifying the appropriate operation(s) for the computation environment 306, which the computation environment 306 uses to lookup the appropriate operation(s) in a local library of operations (or similar operation source). For example, the dynamic system 302 may convey to the computation environment 306 the indicator identifying that the inquiry was the income verification request. Based on the received indicator, the computation environment 306 may obtain the appropriate operation(s) to perform on data fragments received from the partners 304. Similarly, partner systems may receive software updates or other executable instructions from the service or an operator of the service that enable the partners, such as via the client-side module of the partner, to implement the appropriate client-side functionality to generate fragments for a given inquiry type.

When the service 302 is a static service, the service 302 may not be configured to handle different types of inquiries. Thus, the static service 302 may not change the type of inquiries it can process. However, the static service 302 may still send an indicator to the partner 304 to indicate a type of service that the static service 302 is performing so that the partner 304 applies the appropriate operations. The static service 302 may provide the operation(s) in the indicator or merely identify the appropriate operation(s) for the partner 304 to obtain from a local library (or similar operation source).

In some embodiments, the service 302 (for example, via the interface #1 or the interface #2) will receive a request or inquiry, for example from the requesting device 102 and the requesting entity 202. The interface #2 may send the PII related to the inquiry to the orchestrator of the service 302, which will then resolve the PII to obtain the identifiers (hashed or otherwise) associated with the PII with the identity resolution service 303. The orchestrator may then send the obtained identifiers to all CSMs 212. In some embodiments, each CSM 212 receives a different identifier or hashed value that is associated with the same PII but that will only be understandable to appropriate CSMs 212. Each of the CSMs 212 may then query the local database for their respective partner 304 for relevant records or transactions and receive the corresponding records and transactions. Additionally, the CSMs 212 may process the received records and transactions to identify a value related to the inquiry based on the local information only. The CSMs 212 may then fragment the values and send the fragments of the values to the computation environment 306. The computation environment 306 may compute combined attributes based on the fragments received from each of the CSMs 212 and return a result to the orchestrator of the service 302 for distribution to the requesting device 102 and requesting entity 202 as appropriate.

2.2. Partner

Each partner 304 may include one or more components or modules (for example, a client side module, "CSM") installed in its environment. The CSM may correspond to the processor 212 of FIG. 2 and perform processing related to the inquiry locally (for example, local to the partner 304) to reduce computations performed by the computation nodes in the computation environment 306 (for example, the computation nodes 104a-104d). The CSM 212 may responds to requests from the service 302 to initiate the client-side income calculation, for example when the CSM 212 receives the hashed ID from the service 302. The CSM 212 then queries a deposit database of the partner 304 to identify and/or retrieve transactions associated with the hashed ID. The CSM 212 may then use a machine learning based solution to identify income related transactions. In some aspects, the machine learning based solution is pre-trained based on a large volume of deposit transactions collected from a wide range of financial institutions to capture the variations in the data and enable the machine learning based solution to appropriate identify and retrieve corresponding income related transactions. Furthermore, the machine learning based solution can be fine-tuned with specific data for that particular financial institution (e.g., partner 304) if said specific data is determined to be beneficial to the identification and/or retrieval of income related transactions. The machine learning based solution (for example, an income identifying algorithm) classifies the income transactions and summarizes as much as possible at the client-level for that particular financial institution or partner 304. These local results are then fragmented, based on the mathematical design at the core of SMPC, into unrecognizable pieces. The fragmented pieces are then sent to the computation environment 306 for aggregation. As the information of the data has been obfuscated and fragmented before leaving the premise of the computation environment of each partner 304, interception of the individual pieces, or, even multiple pieces of the fragmented data cannot be used to recover the original data.

Each partner 304 may include the CSM 212, which is configured to interface with databases and/or local computing systems of the partner 304 and carry out any needed computations (for example, data fragmentation, etc.) locally, thus reducing risk of confidential or private information being communicated away from the partner 304. In some embodiments, the CSM 212 for each partner may authenticate itself with the orchestrator and/or the computing environment 306 to ensure no compromises exist in the service platform.

As described herein, the CSM 212 of each partner 304 may correspond to local processing resources 212 or networks of the partner 304. As such, the CSM 212 may be tasked with providing all local processing of information from the partner 304, whether that be for credit score application, income verification applications, and so forth. As such, the CSM 212 may receive indications of different operations to perform in the local processing. In some embodiments, the CSM 212 may receive push updates (or similar updates) indicating which appropriate operations the CSM 212 should apply to the partner data. For example, the service 302 may provide a push update to the CSM 212 to indicate the type of request received. The push update from the service 302 may include the appropriate operations for the CSM 212 or may provide an identifier that the CSM 212 uses to obtain the appropriate operations from a local library. Thus, the same CSM 212 for the partner 304 can be used to provide data fragments to the computation environment 306 for different requests (for example, for an income verification request, a credit score request, and so forth). The CSM 212 may use the push updates to ensure that the CSM 212 is using the appropriate operations such that the data fragments can be used by the computation environment 306 to generate a response to the inquiry. In some embodiments, each partner 304 comprises a single CSM 212 that is used for all local processing performed to generate the data fragments for distribution to the computation environment 306. Thus, the CSM 212 may be configured to update the operations (for example, in response to updates or indicators from the services) it can perform on the partner data to provide the data fragments. In some embodiments, each partner comprises multiple CSMs 212 where CSMs 212 do not need to update their operations based on different inquiry types, and so forth.

2.3. Computation Environment

The computation environment 306 jointly computes a function over inputs from the partners 304 while keeping those inputs private from each of the partner 304 and from the computation environment 306 itself by using a group of computation nodes "CN" 104. Such computations guarantee:

1) Input privacy, ensuring that no information about the private data held by one of the partners 304 can be inferred from the messages sent during the execution of the protocol unless more than half of the CNs 104 are compromised; and
2) Correctness, based on the service platform and associated architecture is designed to handle up to n/2-1 compromised HNs, meaning that as long as a majority of CNs 104 execute the protocol faithfully, the results are guaranteed to be correctly computed. In the event that a majority of CNs 104 is compromised, the protocol design guarantees that the remaining uncompromised CNs 104 will detect the comprise with overwhelming probability.

Based on the architecture shown in FIG. 2, the CNs 104 may actively or passively wait for the fragmented data sent from each partner 304 and before beginning their computations. As the computations are being performed, none of the intermediate results are available to any individual CNs 104 or the partners 304 that submitted data. Only upon the completion of the entirety of the computations is the result "revealed" and communicated directly to the service 302 for communication to the inquiring entity, for example via an interface or the third-party application. In some embodiments, as shown in FIG. 2, the CNs 104 may be arranged in a plurality of groups. Such an arrangement may improve efficiencies in scalability and robustness of the computation environment 306.

In some embodiments, the services and/or methods provided by the service platform are enhanced by a sharing of information between each partner 304 and the service 302. For example, each partner 304 may synchronize its client IDs with the services hashed IDs so that the partner 304 knows what client corresponds to hashed IDs received from the service 302 when an inquiry is being processed. This may comprise the partner 304 extracting the PIIs and corresponding customer ID/account ID from its records and/or databases and sending them to the service via secured manner. In response, the partner 304 receives a mapping table or similar structure that maps of the partner's customer ID/account ID to one of the hashed/salted IDs from the service 302. No PII will be return communicated to minimize security risks. The returned salted/hashed ID will be unique for each individual customer ID/account ID for each partner and between different partners so the participating partners 304 will not be able to reference each other's data via received hashed IDs.

The computation environment 306 implements an SMPC framework in a hosted fashion, thereby reducing a complexity of requiring each partner 304 implement its own computation environment. Each of the CNs 104 in a Computation Group (HCG) receives different fragments of information from the CSM 212 deployed in each partner 304 and never combine the information together throughout any calculations.

In some embodiments, the computation environment is hosted as Platform-as-a-Service (PaaS). Accordingly, one or more aspects of the computation environment 306 is implemented as a micro-service. By implementing the computation environment as a PaaS, management of individual resources is simplified and automatic restart in the event of failure is provided.

In some embodiments, the computation environment 306 hosted as the PaaS comprises a plurality of SMPC engines, where each CN 104 or group of CNs 104 comprises an SMPC computation engine. In some embodiments, the SMPC computation engines are run separately in CNs 104 for security purpose. Each of the SMPC engines, therefore, only receives a fragment of any information from the partners 304 so that no nodes at any time can re-assemble/recover the complete information from the fragments they received. The CNs 104 carry out the calculations using these fragments from the partners 304 using Secure Multi-Party Computation protocols to achieve the highest level of security. In addition of the fragmentation concept, communication channels between the engines/CNs 104 are secured via one or more protocols.

In some embodiments, the output of the computation environment 306 may be a response to the initial inquiry or may be an aggregated value based on the fragments received from each of the partners 304A-304C. In some embodiments, the output of the computation environment 306 may be used in additional computations or analysis as applicable.

As each partner may store data in distinct formats, etc., the service 302 may request and/or require that each partner format or map its data in a manner that is understandable by the CSM 212 for each partner 304. For example, in one embodiment, the service 302 may require that each partner 304 include in its databases at least the most recent 24 months deposit transactions of all the customers and have at a minimum number of other fields. For example, fields may include information such as unique customer identifier, account identifier, account type, primary account holder, transaction type(s), transaction time(s), transaction amount(s), transaction description(s), whether a transaction has posted, account numbers that the transaction is from and to, whether a transfer is intra-bank or inter-bank, and/or others. Additional fields may be added and fields may be removed for a given implementation or embodiment.

As a result of the service platform described herein, the response provided back to the inquiring entity is anonymous, and no nodes along the way are able to parse the data to identify private information from individual partners. Additionally, since the partner IDs and the service IDs are synchronized, no PII is shared as part of the inquiries. Furthermore, no data is transferred and/or shared between different partners 304 and/or between each partner 304 and the service 302. Furthermore, the transactions, etc., can be tracked via an immutable private ledger provided in blockchain implementations.

Various challenges are overcome by the described systems and methods. For example, the complexity of the service platform and potential issues in robustness of the service platform are improved by enabling automatic restarts and introducing heartbeats between various components in the service platform while decoupling components to make them as autonomous as possible. Performance of the service platform may be improved by enabling multiple CN groups and by enabling queuing of inquiries or requests while the computation environment 306 is handling a previous request or inquiry.

Figure 4:
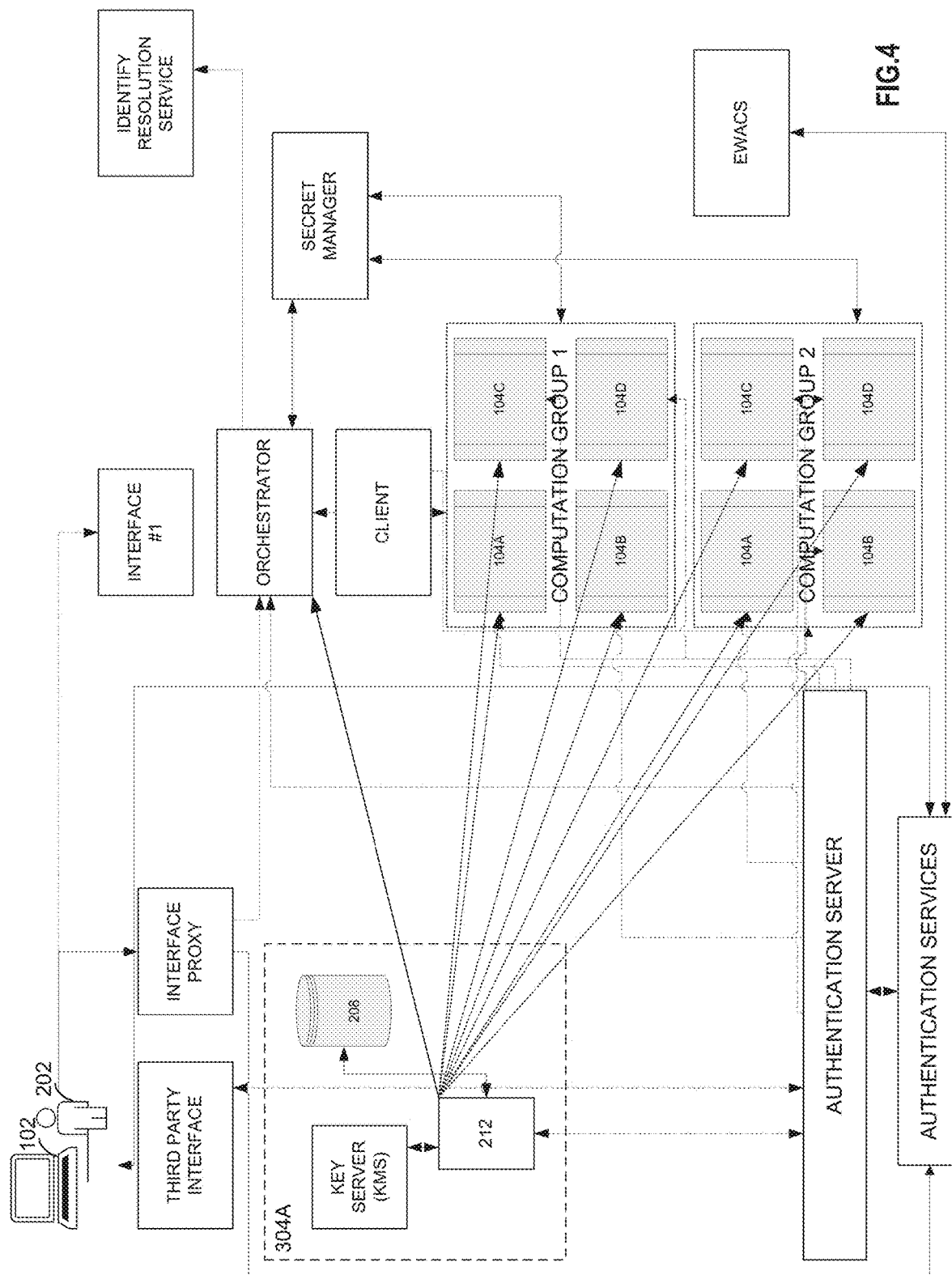
FIG. 4 shows an exemplary deployment and security architecture for the service platform of FIG. 1.

FIG. 4 shows an exemplary deployment and security architecture for the service platform of FIG. 1. In addition to leveraging the security features inherent in Secure Multi-Party Computation that guarantees none of the partner's information is revealed to individual CNs 104 in the computation environment 306, nor to any of other partners 304, the deployment and security architecture of FIG. 4 is implemented.

FIG. 4 shows how the deployment and security architecture is connected and authenticated according to some embodiments. For deployment of the CSM 212 at a partner 304, the CSM 212 may conform to the partner 304 security standards. As such, each partner 304 may include a key management server (KSM) that stores, in an encrypted format, all secret information, such as private keys and passwords. In order for the CSM 212 to gain access to the secret information in the KSM, the CSM may be authenticated by an authentication service. In some embodiments, the KMS is optional, dependent on the partner 304 security standards.

All components on the service platform 100 side may be deployed in a particular environment (for example, a platform as a service (PAAS) environment) and leverage corresponding services (for example, a built-in secret management service to store and access secure information).

In some embodiments, the requesting entity 202 may use the requesting device 102 to interact with the service platform 100. For example, the requesting device 102 may interact with the service platform 100 via a web-based application, a proxy interface, and so forth. In some embodiments, the interface is hosted by the service platform 100. Communications between the requesting device 102 and the interface is secured using HTTPS or a similar scheme. The requesting entity 202 using the requesting device 102 may be authenticated against a credential service of the service platform 100. In some embodiments, such authentication comprises the requesting entity 202 to provide a user name, a password, a client identifier, and a client secret provisioned to obtain an access token (for example, a Java Web Token (JWT)). The access token is then verified by the interface proxy to grant access to a service interface (for example, an income verification service (IVS) interface). In some embodiments, the access token is set to expire after a threshold period of time. For example, when the requesting entity 202 first logs into the service platform 100, a 24-hour life time renewal token is issued. The interface can then use the renewal token to renew the access token up to 24 hours. In some embodiments, the third party interface is similarly authenticated and authorized via access token mechanism to gain access to the service platform API via the interface proxy.

In some embodiments, communications between the CSM 212 and the orchestrator are secured by secure protocol, for example a websocket protocol. The CSM 212 authentication may be performed via the authentication services. In some embodiments, CSM 212 a credential authentication flow, for which a long-life, or even perpetual access token is typically granted, may not approved. Instead, a Resource Owner Password Credential Grant (authentication server) may be used to authenticate the CSM 212. For example, before the CSM 212 is allowed to connect to the orchestrator, the CSM 212 may be authenticated against the service platform credential service to obtain an access token. The access token may then be sent in an authentication header (for example, an HTTP authentication header) when establishing the secure protocol connection to orchestrator. The orchestrator may verify the access token before accepting the connection with the CSM 212. Otherwise, the connection between the CSM 212 and the orchestrator may be terminated or torn down. When the access token expires (for example, after the threshold time expires, e.g., 30 minutes), the orchestrator terminates the secure protocol connection to force the CSM 212 to obtain a new access token and re-establish the secure protocol connection.

In some embodiments, communications between the CSM 212 and computation nodes 104 is secured by HTTPS, or a similar scheme. Before the CSM 212 connects to the computation nodes 104, the CSM 212 may be authenticated against the service platform credential service to obtain an access token that is valid for a threshold period of time. After that, the CSM 212 can use a renewal token to retrieve a new access token for up to 24 hours. Whenever connecting to the computation node 104, the CSM 212 may send an authentication header with the access token. The computation node 104 may validate the access token to establish communications with the CSM 212. Otherwise, the HTTPS (or similar) connection is terminated or torn down. In some embodiments, the threshold period is 30 minutes, such that every 30 minutes, the CSM 212 has to renew its access token using a renewal token and every 24 hours, the CSM 212 has to re-authenticate to restart the renewal cycle. In some embodiments, the CSM 212 credentials are provided by EWACS. In some embodiments, the interface proxy is leveraged to provision the client identifier and client secret, described herein.

In some embodiments, the computation nodes 104 are hosted on the PAAS or similar environment of the service platform 100. As such, the platform may comprise one or more components, in a data center, with all the security components consistent with the service protocol security standards. The computation nodes 104 may be run separately in multiple nodes for security purposes. For example, each of the computation nodes 104 only receives a fragment of any information from the partner 304 so that no nodes or servers at any time can re-assemble/recover the complete information from the fragments they received. The SMPC platform may carry out calculations using these fragments from the partners 304 using the SMCP protocols and operations to achieve high levels of security (or the highest level of security). In addition of the fragmentation concept, communication channels between the computation nodes 104 may be secured via mutual authentication (for example, a TLS protocol) using private keys managed by the PAAS secret manager.

Figure 5A:
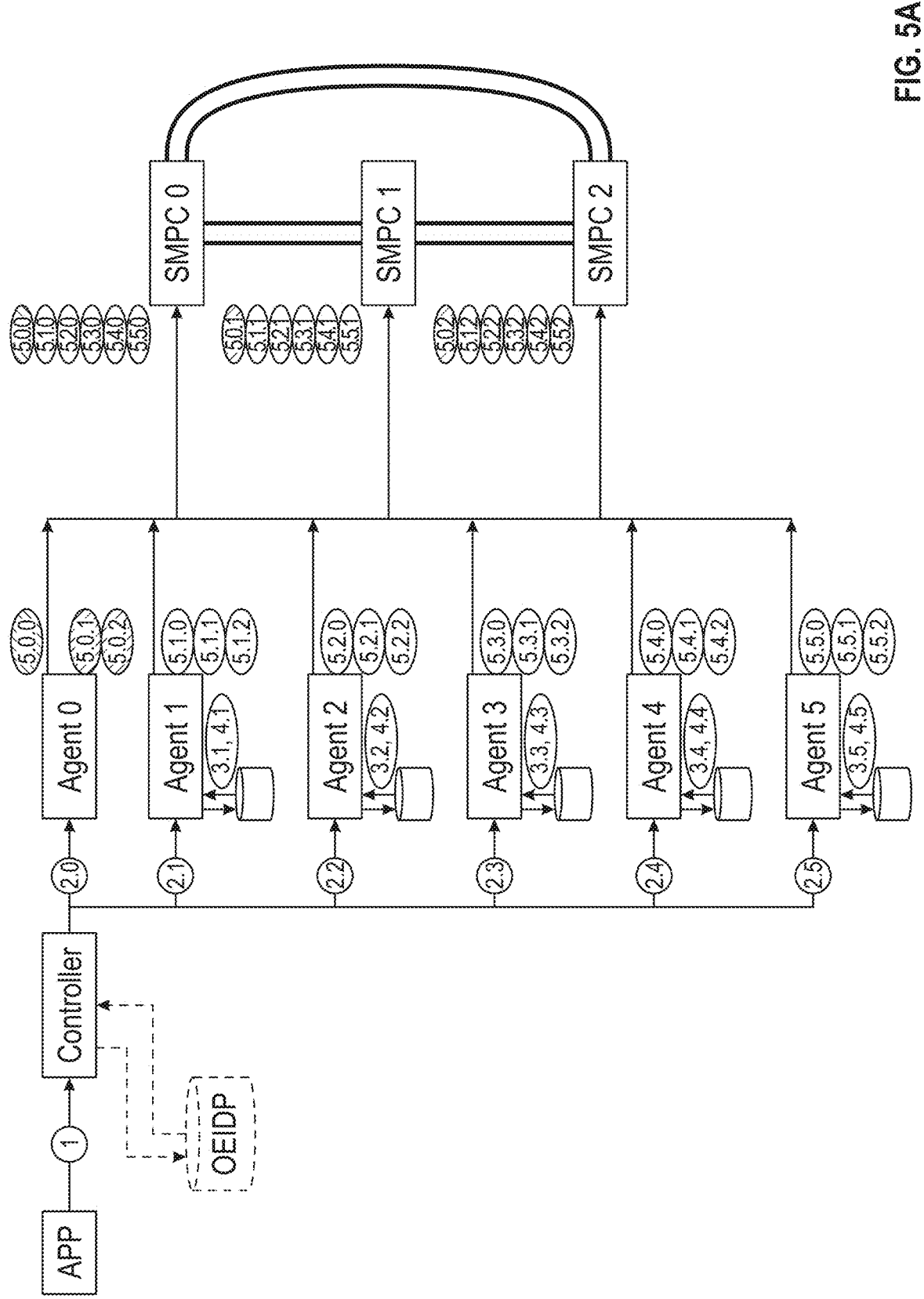
FIG. 5A shows a first exemplary distributed system that implements the service platform of FIG. 1.

FIG. 5A shows a first exemplary distributed system that implements the service platform of FIG. 1. In one example, the distributed system is built on synchronous core with asynchronous peripherals. For example, the SMPC engines work synchronously among themselves. The remaining components of the system perform calculations independently in a distributed, heterogeneous system with no or little coordination between partner 304 CSMs 212.

Such a structure may introduce potential issues. For example, communication link or component failures may cause a message to be received by the SMPC engines out of order, which may cause the entire system to fail.

Figure 5B:
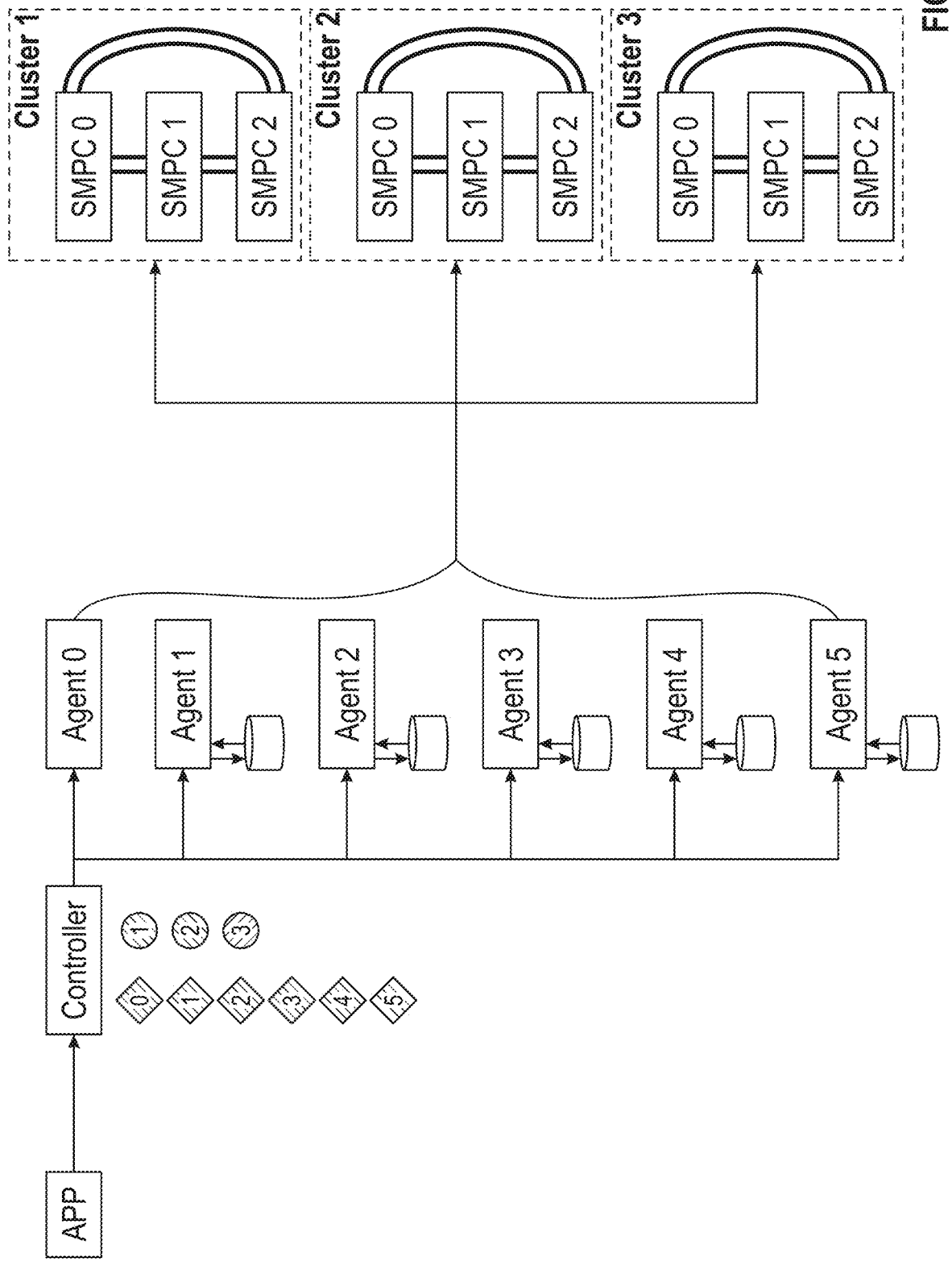
FIG. 5B shows a second exemplary distributed system that implements the service platform of FIG. 1.

FIG. 5B shows a second exemplary distributed system that implements the service platform of FIG. 1, according to one embodiment. In this example, the distributed system decouples components as much as possible. For example, the CSM 212 at each partner 304 connects as needed to the computation environment 306 and to the internal databases of the partner 304. However, the CSM 212 may maintain communication with the service 302 via the heartbeat. The CNs 104 in the computation environment 306 each maintain "all-or-nothing" states. Additionally, they each have separate timers to ensure individual CNs 104 or groups of CNs 104 recover from bad inquiries or inquiries that are not fully computed (for example, not receiving an input from an expected partner 304 CSM 212 or receiving an input late). The computation environment 306 may report the error and then reset to accept the next inquiry.

In some embodiments, the CSM 212 at each partner 304 may detect agent aliveness (Alive/Dead) via heartbeat mechanism. The CN 104 availability may be tracked by periodically probing (synthetic inquiry) to detect aliveness of CN groups or individual CNs 104, maintaining states (Busy/Free/Dead) of individual CNs 104 or CN groups to distribute inquiry loads, distributing inquiries to multiple CNs 104 or CN groups, and queuing inquiries when none of the CNs 104 or CN groups are free.

Example Credit Scoring Use Case

In credit scoring operations, generating a credit score may utilize a "score" function as a general score card, a logistic regression, or, a machine learning-based model such as gradient boosted decision trees. A credit score for a consumer may be calculated by first mapping each of a number of data elements in each individual trade of the consumer. Then, based on the mapped information, a set of "attributes" are calculated for the consumer (such as attributes related to credit limits, percentage of credit used, revolving account balances, number of delinquent accounts, etc.), as is known in the field of credit scoring. Finally, a credit score is calculated for the consumer using a scoring function and all the corresponding attributes.

However, such processing may be time consuming and difficult to complete given privacy and data security concerns, where multiple entities are unwilling to share their data regarding the consumer with each other or a centralized aggregator. Instead, as noted above, decentralized operations using the framework and/or service platform 100 of FIG. 1 may instead be used to implement secure credit score generation based on data from the multiple entities.

For example, following the algorithm described with relation to Equations 1.0 and 2.0 above, the algorithm formulates a centralized version of an income verification/estimation operation as in Equation 6.0 below.

$$\text{Credit score} = \\ \text{Combine}(\text{'consumer'}, \text{score}, \text{Combine}(\text{'consumer'}, a_1, \\ \text{Map}(\text{'trade'}, l_{a_1,1}, X), \text{Map}(\text{'trade'}, l_{a_1,2}, X), \ldots, \\ \text{Map}(\text{'trade'}, l_{a_1,j_{a_1}}, X)), \text{Combine}(\text{'consumer'}, \\ a_2, \text{Map}(\text{'trade'}, l_{a_2,1}, X), \text{Map}(\text{'trade'}, l_{a_2,2}, X), \\ \ldots, \text{Map}(\text{'trade'}, l_{a_2,j_{a_2}}, X)), \\ \ldots \ldots \ldots, \text{Combine}(\text{'consumer'}, a_k, \\ \text{Map}(\text{'trade'}, l_{a_k,1}, X), \text{Map}(\text{'trade'}, l_{a_k,2}, X), \\ \ldots, \text{Map}(\text{'trade'}, l_{a_k,j_{a_k}}, X))))$$

EQUATION 6.0

As described above, the algorithm decomposes the centralized solution in Equation 6.0 to generate a decentralized solution by allowing for the data to be from each of the data providers, as noted in Equations 7.0 and 7.1 below:

$$\text{credit score} = \text{Combine}(\text{'consumer'}, \text{score}, \\ \text{Combine}(\text{'consumer'}, a_1, \text{Map}(\text{'trade'}, l_{a_1,1}, X_{B_1-B_n}), \text{Map}(\text{'trade'}, l_{a_1,2}, X_{B_1-B_n}), \ldots, \text{Map}(\text{'trade'}, l_{a_1,j_{a_1}}, X_{B_1-B_n})), \\ \text{Combine}(\text{'consumer'}, a_2, \text{Map}(\text{'trade'}, l_{a_2,1}, X_{B_1-B_n}), \text{Map}(\text{'trade'}, l_{a_2,2}, X_{B_1-B_n}), \ldots, \text{Map}(\text{'trade'}, l_{a_2,j_{a_2}}, X_{B_1-B_n})), \\ \ldots \ldots \ldots, \text{Combine}(\text{'consumer'}, a_k, \text{Map}(\text{'trade'}, l_{a_k,1}, X_{B_1-B_n}), \text{Map}(\text{'trade'}, l_{a_k,2}, X_{B_1-B_n}), \ldots, \text{Map}(\text{'trade'}, l_{a_k,j_{a_k}}, X_{B_1-B_n})))$$

Equation 7.0

$$\text{credit score} = \text{Combine}(\text{'consumer'}, \text{score}, \\ \text{Combine}\begin{pmatrix} \text{'consumer'}, a_1, \text{Map}(\text{'trade'}, l_{a_1,1}, X_{B_1}), \text{Map}(\text{'trade'}, l_{a_1,2}, X_{B_1}), \ldots, \text{Map}(\text{'trade'}, l_{a_1,j_{a_1}}, X_{B_1}), \\ \text{Map}(\text{'trade'}, l_{a_1,1}, X_{B_2}), \text{Map}(\text{'trade'}, l_{a_1,2}, X_{B_2}), \ldots, \text{Map}(\text{'trade'}, l_{a_1,j_{a_1}}, X_{B_2}), \\ \ldots \ldots \ldots, \\ \text{Map}(\text{'trade'}, l_{a_1,1}, X_{B_n}), \text{Map}(\text{'trade'}, l_{a_1,2}, X_{B_n}), \ldots, \text{Map}(\text{'trade'}, l_{a_1,j_{a_1}}, X_{B_n}) \end{pmatrix}, \\ \text{Combine}\begin{pmatrix} \text{'consumer'}, a_2, \text{Map}(\text{'trade'}, l_{a_2,1}, X_{B_1}), \text{Map}(\text{'trade'}, l_{a_2,2}, X_{B_1}), \ldots, \text{Map}(\text{'trade'}, l_{a_2,j_{a_2}}, X_{B_1}), \\ \text{Map}(\text{'trade'}, l_{a_2,1}, X_{B_2}), \text{Map}(\text{'trade'}, l_{a_2,2}, X_{B_2}), \ldots, \text{Map}(\text{'trade'}, l_{a_2,j_{a_2}}, X_{B_2}), \\ \ldots \ldots \ldots, \\ \text{Map}(\text{'trade'}, l_{a_k,1}, X_{B_n}), \text{Map}(\text{'trade'}, l_{a_k,2}, X_{B_n}), \ldots, \text{Map}(\text{'trade'}, l_{a_k,j_{a_k}}, X_{B_n}) \end{pmatrix}, \\ \ldots \ldots \ldots, \text{Combine}\begin{pmatrix} \text{'consumer'}, a_k, \text{Map}(\text{'trade'}, l_{a_k,1}, X_{B_1}), \text{Map}(\text{'trade'}, l_{a_k,2}, X_{B_1}), \ldots, \text{Map}(\text{'trade'}, l_{a_k,j_{a_k}}, X_{B_1}), \\ \text{Map}(\text{'trade'}, l_{a_k,1}, X_{B_2}), \text{Map}(\text{'trade'}, l_{a_k,2}, X_{B_2}), \ldots, \text{Map}(\text{'trade'}, l_{a_k,j_{a_k}}, X_{B_2}), \\ \ldots \ldots \ldots, \\ \text{Map}(\text{'trade'}, l_{a_k,1}, X_{B_n}), \text{Map}(\text{'trade'}, l_{a_k,2}, X_{B_n}), \ldots, \text{Map}(\text{'trade'}, l_{a_k,j_{a_k}}, X_{B_n}) \end{pmatrix})$$

Equation 7.1

The algorithm then identifies the $C\_or\_M_{local}$ and $C\_or\_M_{secure}$ operations for the Equation 7.1. For example, the algorithm identifies the Map functions in Equation 7.1 to be executable locally in the data providers and the Combine functions to be executed in the SMPC platform when they are not decomposable. This example is described in more detail below.

The service platform 100 of FIG. 1 may compute a consumer's credit score. The specifically, the computation nodes 104a-104d of the SMPC platform may comprise one or more components used to compute the consumer's credit score (for example, Bob Dixon's credit score). For example, the SMPC platform may have access to one or more secure credit score models and the secure attributes as provided by the data providers. The credit score models may enable the computation nodes 104a-104d of the SMPC platform to calculate a consumer's (for example, Bob Dixon's) credit score based on the data fragments provided by the data providers. In some embodiments, the SMPC platform may comprise one or more layers of functions that ensure security of calculations of the credit attributes and scores.

For example, a filter layer of the SMPC platform may comprise functions that calculate summary statistics on consumer trades for credit attribute calculation. However, such calculations may be based primarily on information from a single data provider; as such, that data provider having the information may perform the calculations locally. The local processing may improve times involved to perform calculations by reducing times for communicating the information on which the calculations are based. The filter layer may provide such filters for the local agents or processors 212 of the data providers that are commonly used in attribute calculation. In some embodiments, the filter layer works alongside a virtual machine layer or similar tool that implements secure computations by the computation nodes 104a-104d.

The SMPC platform may comprise the secure data adapter layer. The secure data adapter layer may provide an adapter that connects between databases of different data providers and the computation nodes of the SMPC platform (for example, the secure connection described above with reference to FIG. 1). In some embodiments, the secure connection may create a secure connection between the computation nodes 104a-104d and the institutions 106a-106g to maintain data security and privacy. In some embodiments, the secure data adapter layer sits on top of (for example, connects to) the virtual machine and/or the filter layer.

In some embodiments, the SMPC platform comprises a secure common functions layer. The secure common functions layer comprises one or more calculations that may be used to calculate the credit attributes. The secure common functions layer may provide a variety of functions to calculate statistics, for example, average, minimum, maximum, sum, count, and so forth across a given set of trades for a consumer. Each function allows for initialization, and capping under customized conditions. In some embodiments, all the calculations are carried out securely under the SMPC protocol without revealing any individual data provider's private data. In some embodiments, the secure common functions layer sits on top of (for example, connects to) a virtual machine and/or a filter layer alongside the secure data adapter layer.

The SMPC platform may include a secure attributes layer. The secure attributes layer may implement a number of secure attributes (for example, over 100 secure attributes). The SMCP platform may further comprise a secure credit score model layer that provides capabilities for calculating a credit score for the consumer securely based on secure attributes. The secure credit score model layer sits on top of (for example, connects to) the secure attributes layer.

Such an implementation for credit score determinations for a consumer may improve and/or overcome various issues of data aggregators, for example reducing calculation times and enabling real-time calculations. Different numbers of computation nodes in the SMPC platform may impact calculation times. For example, as the number of computation nodes 104 increases, the communication costs may increase. Thus, as more computation nodes 104 are included in the SMPC platform, a number of computations that can be handled in a given timeframe may reduce when computing in real time. However, increasing the number of computation nodes 104 may increase a number of consumers for which the SMPC can process credit scores in a given amount of time, when computing in batch.

These results demonstrate a feasibility of the SMPC platform and corresponding service platform 100 for calculating the credit attributes and scores real-time and/or batch. In some embodiments, having the computation nodes disposed in different networks (for example, different networks 108) may change how quickly the above computations can be performed. Additionally, increasing the number of computation nodes while improving communication costs may reduce computation times.

3. Example System Implementation and Architecture

Figure 6:
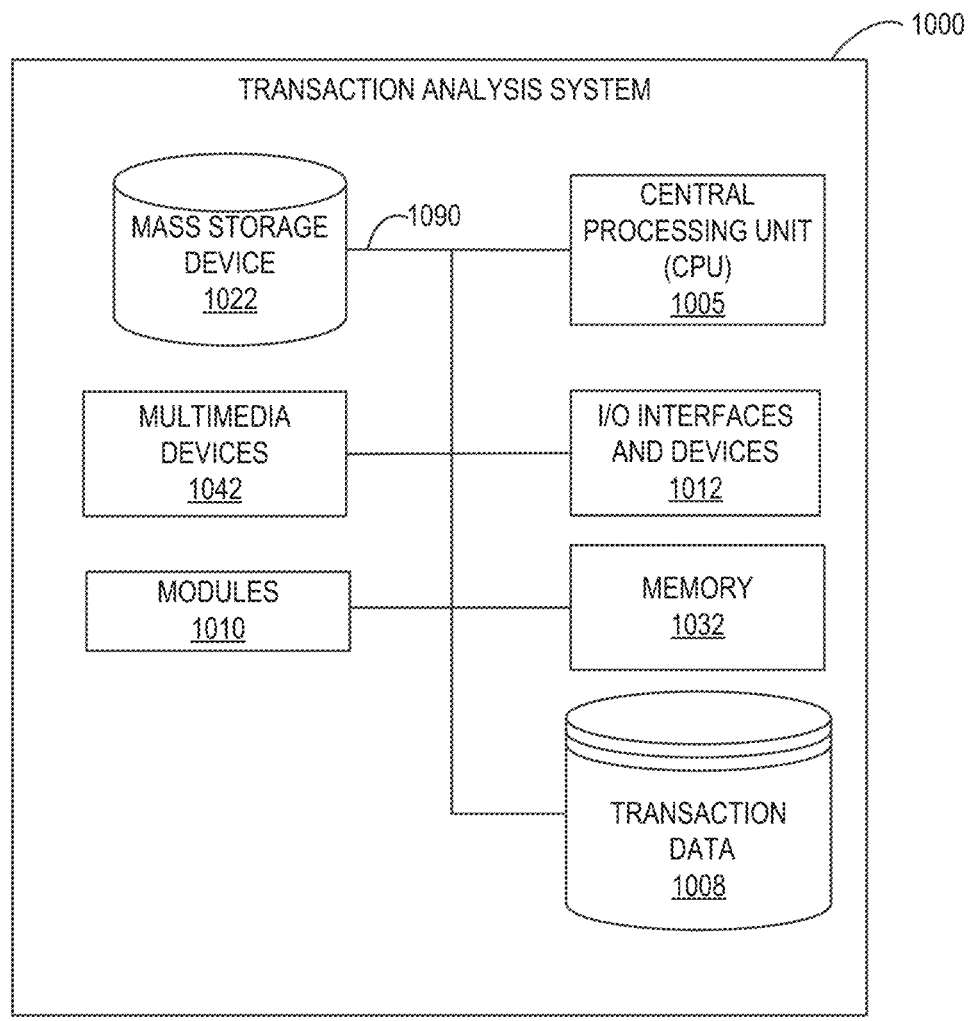
FIG. 6 is a block diagram showing example components of a transaction data processing system 1000.

FIG. 6 is a block diagram showing example components of a transaction data processing system 1000. The system 1000 or variations thereof may be used, in some embodiments, as part of the service 302, to implement computation nodes in an SMPC arrangement and/or by a partner to implement CSM 212 functionality. The processing system 1000 includes, for example, a personal computer that is IBM, Macintosh, or Linux/Unix compatible or a server or workstation. In one embodiment, the processing system 1000 includes a server, a laptop computer, a smart phone, a personal digital assistant, a kiosk, or a media player, for example. In one embodiment, the processing system 1000 includes one or more central processing unit ("CPU") 1005, which may each include a conventional or proprietary microprocessor specially configured to perform, in whole or in part, one or more of the machine learning recommendation/result model features described above. The processing system 1000 further includes one or more memory 1032, such as random access memory ("RAM") for temporary storage of information, one or more read only memory ("ROM") for permanent storage of information, and one or more mass storage device 1022, such as a hard drive, diskette, solid state drive, or optical media storage device. A specially architected transaction data store 1008 may be provided. The transaction data store 1008 may be optimized for storing raw and/or compressed transaction data as well as recommendation/result modeling data as described above. In some implementations, the transaction data store 1008 may be designed to handle large quantities of data and provide fast retrieval of the records. To facilitate efficient storage and retrieval, the transaction data store 1008 may be indexed using one or more of compressed transaction data, user identifiers, transaction category, merchant identifiers, or other data such as described above.

Typically, the components of the processing system 1000 are connected using a standards-based bus system 1090. In different embodiments, the standards-based bus system 1090 could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of processing system 1000 may be combined into fewer components and modules or further separated into additional components and modules.

The processing system 1000 is generally controlled and coordinated by operating system software, such as Windows XP, Windows Vista, Windows 7, Windows 8, Windows Server, Unix, Linux, SunOS, Solaris, iOS, Blackberry OS, Android, or other compatible operating systems. In Macintosh systems, the operating system may be any available operating system, such as MAC OS X. In other embodiments, the processing system 1000 may be controlled by a proprietary operating system. The operating system is configured to control and schedule computer processes for execution, perform memory management, provide file system, networking, I/O services, and provide a user interface, such as a graphical user interface ("GUI"), among other things.

The processing system 1000 may include one or more commonly available input/output (I/O) devices and interfaces 1012, such as a keyboard, mouse, touchpad, and printer. In one embodiment, the I/O devices and interfaces 1012 include one or more display devices, such as a monitor, that allows the visual presentation of data to a user. More particularly, a display device provides for the presentation of GUIs, application software data, and multimedia presentations, for example. The processing system 1000 may also include one or more multimedia devices 1042, such as speakers, video cards, graphics accelerators, and microphones, for example.

In the embodiment of FIG. 6, the I/O devices and interfaces 1012 provide a communication interface to various external devices. The processing system 1000 may be electronically coupled to one or more networks, which comprise one or more of a LAN, WAN, cellular network, satellite network, and/or the Internet, for example, via a wired, wireless, or combination of wired and wireless, communication link. The networks communicate with various computing devices and/or other electronic devices via wired or wireless communication links, such as the credit bureau data source and financial information data sources.

In some embodiments, information may be provided to the processing system 1000 over a network from one or more data sources. The data sources may include one or more internal and/or external data sources that provide transaction data, such as credit issuers (e.g., financial institutions that issue credit cards), transaction processors (e.g., entities that process credit card swipes at points of sale), and/or transaction aggregators. The data sources may include internal and external data sources which store, for example, credit bureau data (for example, credit bureau data) and/or other user data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the processing system 1000, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules. They may be represented in hardware or firmware. Generally, the modules described herein refer to logical modules that may be combined with other modules or divided into sub-modules despite their physical organization or storage.

In the example of FIG. 6, the modules 1010 may be configured for execution by the CPU 1005 to perform, in whole or in part, any or all of the process discussed above, such as those shown in FIGS. 1, 2, 3, 4, 5A, and 5B.

4. Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more specially configured general purpose computers. For example, the methods described herein may be performed by a processing system, card reader, point of sale device, acquisition server, card issuer server, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, compact disk read-only memories (CD-ROMs), magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Further detail regarding embodiments relating to the systems and methods disclosed herein, as well as other embodiments, is provided in the Appendix of the present application, the entirety of which is bodily incorporated herein and the entirety of which is also incorporated by reference herein and made a part of this specification. The Appendix provides examples of features that may be provided by a system that implements at least some of the functionality described herein, according to some embodiments, as well as specific system configuration and implementation details according to certain embodiments of the present disclosure.

What is claimed is:

1. A data aggregation and computation system, comprising:
    an interface configured to receive an inquiry from a requesting entity system for computing information regarding an individual based on pieces of protected information held by a plurality of data provider systems wherein the computing information is generated based on at least a first analytic process and a second analytic process;
    a controller configured to communicate an identifier corresponding to the individual to a plurality of local processor systems wherein each of the plurality of local processor systems is associated with a respective one of the data provider systems based on the inquiry, wherein each of the local processor systems is configured to perform the first analytic process comprising processing one or more of the pieces of protected information held by the respective data provider associated with the respective local processor system to generate processed local data and generating encrypted data fragments based on the processed local data, wherein the encrypted data fragments comprise unrecognizable fragments that no other local processor system can re-assemble to recover the one or more pieces of the protected information; and
    one or more clusters of computation nodes, each of the one or more clusters comprising instructions that when executed cause the respective cluster to perform the second analytic process, the instructions comprising:
        receiving the encrypted data fragments from each of the plurality of local processor systems without access to the protected information;
        performing secure, multi-party computations based on the data fragments received from each of the plurality of local processor systems;
        generating a result based on the secure, multi-party computations for the individual; and
        communicating the result to the controller;
    wherein the controller is further configured to generate a response and provide the response to the interface for providing to the requesting entity system.

2. The system of claim 1, wherein the plurality of data provider systems comprises one or more of: a financial institution, a healthcare institution, or a consumer data institution.

3. The system of claim 1, further comprising an identifier database, wherein the controller is further configured to:
    identify respective identifiers of the individual for each of the plurality of data provider systems based on the inquiry, and
    communicate the respective identifiers to the respective local processor system associated with each of the data provider systems.

4. The system of claim 1, wherein each of the one or more clusters of computation nodes further comprises instructions that when executed cause the respective cluster to receive the data fragments for further processing in aggregate from the local processor systems associated with each of the data provider systems, and wherein each local processor system is further configured to perform initial computations on individual pieces of the one or more of the pieces of protected information before generating the data fragments.

5. The system of claim 4, wherein the controller is further configured to identify the initial computations performed by the respective local processor system associated with each of the data provider systems and the secure, multi-party computations performed by the one or more clusters of computation nodes.

6. The system of claim 1, wherein the controller is further configured to identify a quantity of computation nodes in the one or more clusters that perform the secure, multi-party computations, wherein the quantity is based on a desired security level.

7. The system of claim 1, wherein the inquiry comprises an information verification request comprising verification information to be verified, and wherein the response is an affirmative or negative response.

8. The system of claim 7, wherein the interface is further configured to provide the affirmative response to the requesting entity system in response to the inquiry when the result verifies the verification information and provide the negative response in response to the inquiry when the result does not verify the verification information.

9. The system of claim 8, wherein each of the one or more clusters of computation nodes further comprises instructions that when executed cause the respective cluster to compute an income value for the individual based on the data fragments received from each of the local processor systems, and wherein the result verifies the verification information when a difference between the verification information and the income value is less than or equal to a threshold value and wherein the result does not verify the verification information when the difference is greater than the threshold value.

10. The system of claim 1, wherein the inquiry comprises a request to compute a credit score for the individual, and wherein the response comprises the credit score for the individual.

11. A method of aggregating and processing data, comprising:
receiving an inquiry from a requesting entity system for computing information regarding an individual based on pieces of protected information held by a plurality of data provider systems;
communicating an identifier corresponding to the individual to a plurality of local processor systems wherein each of the plurality of local processor systems is associated with a respective one of the data provider systems based on the inquiry and are configured to process one or more of the pieces of protected information held by the respective data provider associated with the respective local processor system to generate processed local data and generate encrypted data fragments based on the processed local data, wherein the encrypted data fragments comprise unrecognizable fragments that no other local processor system can re-assemble to recover the one or more pieces of the protected information;
receiving the encrypted data fragments from each of the plurality of local processor systems without access to the protected information
performing secure, multi-party computations based on the data fragments received from each of the plurality of local processor systems;
generating a result based on the secure multi-party computations for the individual;
communicating the result to a controller; and
generating a response and provide the response to an interface for providing to the requesting entity system.

12. The method of claim 11, wherein the plurality of data provider systems comprises one or more of a financial institution, a healthcare institution, or a consumer data institution.

13. The method of claim 11, further comprising:
identifying respective identifiers of the individual for each of the plurality of data provider systems based on the inquiry, and
communicating the respective identifiers to the respective local processor system associated with each of the data provider systems.

14. The method of claim 11, further comprising receiving the data fragments for further processing in aggregate from the local processor systems associated with each of the data provider systems, wherein each processor system is further configured to perform initial computations on individual pieces of the one or more pieces of protected information before generating the data fragments.

15. The method of claim 14, further comprising identifying the initial computations performed by the respective local processor system associated with each of the data provider systems and the secure, multi-party computations performed by the one or more clusters of computation nodes.

16. The method of claim 11, further comprising identifying a quantity of computation nodes in the one or more clusters that perform the secure, multi-party computations, wherein the quantity is based on a desired security level.

17. The method of claim 11, wherein the inquiry comprises an information verification request comprising verification information to be verified, and wherein the response is an affirmative or negative response.

18. The method of claim 17, further comprising providing the affirmative response to the requesting entity system in response to the inquiry when the result verifies the verification information and providing the negative response in response to the inquiry when the result does not verify the verification information.

19. The method of claim 18, further comprising computing an income value for the individual based on the data fragments received from each of the local processor systems, wherein the result verifies the verification information when a difference between the verification information and the income value is less than or equal to a threshold value and wherein the result does not verify the verification information when the difference is greater than the threshold value.

20. A non-transitory computer storage medium storing computer-executable instructions that, when executed by one or more processors, cause the one or more processors to at least:
receiving an inquiry from a requesting entity system for computing information regarding an individual based on pieces of protected information held by a plurality of data provider systems;
communicating an identifier corresponding to the individual to a plurality of local processor systems wherein each of the plurality of local processor systems is associated with a respective one of the data provider systems based on the inquiry configured to process one or more of the pieces of protected information held by the respective data provider associated with the respective local processor system to generate processed local data, and generate encrypted data fragments based on the processed local data, wherein the encrypted data fragments comprise unrecognizable fragments that no other local processor system can re-assemble to recover the one or more pieces of the protected information;

receiving the encrypted data fragments from each of the plurality of local processor systems without access to the protected information;

performing secure, multi-party computations based on the data fragments received from each of the plurality of local processor systems;

generating a result based on the secure multi-party computations for the individual;

communicating the result to a controller; and generating a response and provide the response to an interface for providing to the requesting entity system.

* * * * *